United States Patent
Zhao et al.

(10) Patent No.: US 12,410,271 B1
(45) Date of Patent: Sep. 9, 2025

(54) $CO_2$ CHEMICAL REACTION VISCOSITY-INCREASING TYPE POLYMER SURFACTANT FOR GAS CHANNELING CONTROL DURING $CO_2$ FLOODING IN OFFSHORE HEAVY OIL RESERVOIRS, PREPARATION METHOD THEREFOR AND USE THEREOF

(71) Applicants: China University of Petroleum (East China), Qingdao (CN); Qingdao University of Science and Technology, Qingdao (CN); Sichuan University, Chengdu (CN)

(72) Inventors: Guang Zhao, Qingdao (CN); Jia Chen, Qingdao (CN); Caili Dai, Qingdao (CN); Haoran Cheng, Qingdao (CN); Bin Yan, Chengdu (CN); Hao Ren, Qingdao (CN); Yong Zheng, Qingdao (CN); Lianming Zhao, Qingdao (CN); Qin Yang, Chengdu (CN); Wanlei Geng, Qingdao (CN); Qingfeng Liu, Qingdao (CN)

(73) Assignees: China University of Petroleum (East China), Qingdao (CN); Qingdao University of Science and Technology, Qingdao (CN); Sichuan University, Chengdu (CN)

(*) Notice: Subject to any disclaimer, the term of this patent is extended or adjusted under 35 U.S.C. 154(b) by 0 days.

(21) Appl. No.: 19/032,730

(22) Filed: Jan. 21, 2025

(30) Foreign Application Priority Data

Dec. 6, 2024 (CN) .......................... 202411794479.0

(51) Int. Cl.
C09K 8/44 (2006.01)
C08F 220/56 (2006.01)
(Continued)

(52) U.S. Cl.
CPC ............ C08F 220/56 (2013.01); C09K 8/426 (2013.01); C09K 8/44 (2013.01); E21B 33/138 (2013.01);
(Continued)

(58) Field of Classification Search
CPC .................. C08F 220/56; C08F 2800/10; C08F 2810/50; C09K 8/426; C09K 8/44; E21B 33/138; E21B 43/164
See application file for complete search history.

(56) References Cited

PUBLICATIONS

Wang (Y. Wang et al, CO2-fueled transient breathing nanogels that couple nonequilibrium catalytic polymerization, Angew. Chem. Int. Ed. 2023, 62, e202217001).*

(Continued)

Primary Examiner — Kumar R Bhushan
(74) Attorney, Agent, or Firm — Calfee, Halter & Griswold LLP

(57) ABSTRACT

The present disclosure relates to the technical field of oilfield chemistry, and discloses a $CO_2$ chemical reaction viscosity-increasing type polymer surfactant for gas channeling control during $CO_2$ flooding in offshore heavy oil reservoirs, a preparation method therefor and use thereof, the $CO_2$ reactive viscosity-increasing polymer surfactant includes structural units represented by formula (1), formula (2) and a formula (3) respectively; $R_1$, $R_2$, $R_3$, $R_4$ and $R_5$ in formula (1) are respectively one or more of H, F, $C_1$-$C_4$ alkyl alcohol, and at least one group is F; $R_6$, $R_7$ and $R_8$ in formula (2) are respectively one or more of H, $C_1$-$C_4$ alkyl; R in formula (3) is one or more of $C_{10}$-$C_{16}$ alkyl; the $CO_2$ reactive viscosity-increasing polymer surfactant has a high $CO_2$ gas channeling plugging strength, excellent chemical stability, and desirable heavy oil viscosity reduction performance;

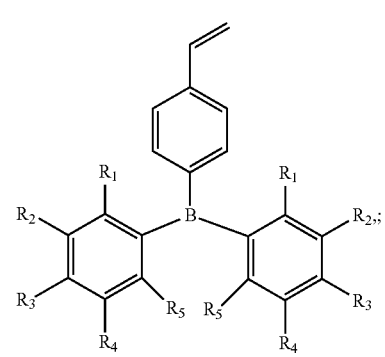

(1)

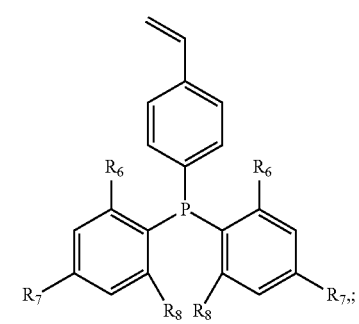

(2)

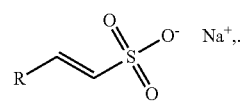

(3)

19 Claims, 3 Drawing Sheets

(51) Int. Cl.
    *C09K 8/42*          (2006.01)
    *E21B 33/138*      (2006.01)
    *E21B 43/16*       (2006.01)

(52) U.S. Cl.
    CPC ........ *E21B 43/164* (2013.01); *C08F 2800/10* (2013.01); *C08F 2810/50* (2013.01)

(56) References Cited

PUBLICATIONS

Gong (Z. Gong et al, Polymeric partners breathe together: using gas to direct polymer self-assembly via gas-bridging chemistry, Science China Chemistry, Jul. 2022 vol. 65 No. 7: 1401-1410).*
Zeng (R. Zeng et al, $CO_2$-folded single-chain nanoparticles as recyclable, improved carboxylase mimics, Angew. Chem. Int. Ed. 2020, 59, 18418-18422).*
Wang-1 (M. Wang et al, Frustrated Lewis pair polymers as responsive self-healing gels, J. Am. Chem. Soc. 2017, 139, 14232-14236).*
Chen (S. Chen, et al, Coordination chemistry inside polymeric nanoreactors: metal migration and cross-exchange in amphiphilic core-shell polymer latexes, Polymers 2016, 8, 26).*

* cited by examiner

$CO_2$ CHEMICAL REACTION VISCOSITY-INCREASING TYPE POLYMER SURFACTANT FOR GAS CHANNELING CONTROL DURING $CO_2$ FLOODING IN OFFSHORE HEAVY OIL RESERVOIRS, PREPARATION METHOD THEREFOR AND USE THEREOF

CROSS-REFERENCE TO RELATED APPLICATIONS

The present application claims priority to the Chinese Application No. 202411794479.0, filed on Dec. 6, 2024, entitled $CO_2$ chemical reaction viscosity-increasing type polymer surfactant for gas channeling control during $CO_2$ flooding in offshore heavy oil reservoirs, a preparation method therefor and use thereof, which is specifically and entirely incorporated herein by reference.

FIELD

The present disclosure relates to the technical field of oilfield chemistry, in particular to a $CO_2$ chemical reaction viscosity-increasing type polymer surfactant for gas channeling control during $CO_2$ flooding in offshore heavy oil reservoirs polymer, a preparation method therefor and use thereof.

BACKGROUND

Along with the process that the global crude oil and energy demand has been increasing year by year, and the existing crude oil is gradually depleted, the rational exploitation of heavy oil is particularly important. On a global scale, because of the long-term recovery of existing crude oil, the offshore heavy oil resources account for an increased proportion of the total oil reserve and exceed 70% of total offshore oil reserves worldwide. Given that $CO_2$ has the advantages such as desirable miscibility with crude oil, effectively reducing the viscosity of crude oil, reducing the interfacial tension, volume expansion, extraction of light hydrocarbons, the offshore heavy oil $CO_2$ flooding technologies are vital for the efficient development of heavy oil reservoirs. However, when compared with the offshore heavy oil water flooding reservoirs, the offshore heavy oil $CO_2$ flooding technologies confront with the following challenges: (1) The offshore heavy oil is mostly a loose sandstone reservoir, which has characteristics such as a loose rock cementation, a high reservoir permeability, and severe heterogeneity, and affected by excessive large $CO_2$/heavy oil mobility difference, the injected $CO_2$ will inevitably cause channeling, resulting in poor energy replenishment and low sweep efficiency. (2) Gas channeling control is the key for efficient $CO_2$ flooding and sequestration, while the profile control and oil displacement agent is the core, the conventional profile control and oil displacement agent is influenced by the strong solubility of $CO_2$ in water with a strong acidity, and high intensity of gas injection, it has the defects such as "lacking sufficient resistance and control force for a long time".

Therefore, it is urgent to develop an efficient $CO_2$ gas channeling control system to improve the $CO_2$ flooding effect. The $CO_2$ responsive materials, which properties can vary with the environment and space, have emerged as the hot spot of researches in the field of gas channeling control, wherein the most mature materials in researches are $CO_2$ responsive viscosity-increasing type polymers or surfactants such as amines, amidines, guanidines and nitrogen-containing heterocycles. The responsive polymers or surfactants are used for carrying out the protonation reaction with $CO_2$, countra-ion electrostatic shielding and self-assembly effects, the aggregation morphology of said polymers or surfactants is transformed from sphericity to worm-like micelles, which intertwine to form a highly viscoelastic three-dimensional network structure, thereby plugging the gas channeling channels, expanding the swept volume of $CO_2$ and improving the flooding efficiency. However, the $CO_2$ responsive viscosity-increasing polymers/surfactants mainly plug the gas channeling channels through the non-covalent physical association viscosification, the polymers/surfactants are susceptible to external factors such as invasion and dilution by front edge of water body, charge shielding of highly mineralized formation water, dissolution effect of residual oil, resulting in unstable systems and uncontrollable gas channeling channels. Therefore, it is necessary to transform the unstable non-covalent physical association viscosification to stable chemical covalent viscosification, i.e., transformation from the responsive viscosification to direct chemical reaction viscosification.

Consequently, in regard to the specificity of offshore heavy oil $CO_2$ flooding and sequestration environments, there is an urgent need for a $CO_2$ reactive viscosity-increasing polymer surfactant with desirable stability, high gas channeling plugging strength, and excellent heavy oil viscosity reduction performance to improve the development efficiency of offshore heavy oil reservoirs.

SUMMARY

The present disclosure aims to overcome the defects in the existing that the $CO_2$ responsive viscosity-increasing polymers or surfactants have low $CO_2$ gas channeling plugging strength, and are prone to suffer from destabilization and/or failure, provide a $CO_2$ chemical reaction viscosity-increasing type polymer surfactant for gas channeling control during $CO_2$ flooding in offshore heavy oil reservoirs, a preparation method therefor and use thereof, the $CO_2$ reactive viscosity-increasing type polymer surfactant has a high $CO_2$ gas channeling plugging strength, excellent chemical stability, and desirable heavy oil viscosity reduction performance.

In order to achieve the above object, the first aspect of the present disclosure provides a $CO_2$ reactive viscosity-increasing polymer surfactant, wherein the $CO_2$ reactive viscosity-increasing polymer surfactant comprises structural units provided by a Lewis acid monomer represented by formula (1), structural units provided by a Lewis base monomer represented by formula (2), structural units provided by a hydrophilic monomer, and structural units provided by an interfacially active monomer represented by formula (3);

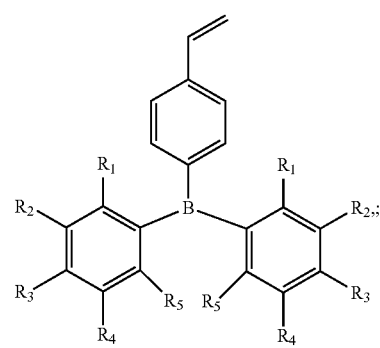

formula (1)

wherein $R_1$, $R_2$, $R_3$, $R_4$ and $R_5$ in formula (1) are the same or different, each is one or more of H, F, $C_1$-$C_4$ alkyl alcohol, and at least one group is F;

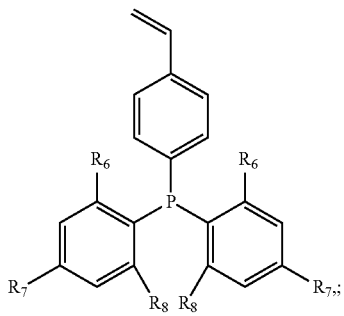
(2)

wherein $R_6$, $R_7$ and $R_8$ in formula (2) are the same or different, each is one or more of H, $C_1$-$C_4$ alkyl;

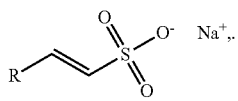
formula (3)

wherein R in formula (3) is one or more of $C_{10}$-$C_{16}$ alkyl.

The second aspect of the present disclosure provides a method for preparing the aforementioned $CO_2$ reactive viscosity-increasing polymer surfactant, wherein the method comprising:

(F1) Blending a Lewis acid monomer represented by formula (1), a Lewis base monomer represented by formula (2), a hydrophilic monomer, and an interfacially active monomer represented by formula (3) with a solvent to obtain a mixture;

(F2) Contacting the mixture with an initiator under the protection of an inert gas to carry out reaction;

(F3) Contacting the reaction product obtained from step (F2) with an alcohol solvent, and subjecting to precipitation, filtration and drying treatment to prepare a $CO_2$ reactive viscosity-increasing polymer surfactant.

The third aspect of the present disclosure provides a method of using the aforementioned $CO_2$ reactive viscosity-increasing polymer surfactant for gas channeling control during $CO_2$ flooding in offshore heavy oil reservoirs.

Due to the technical scheme, the $CO_2$ reactive viscosity-increasing polymer surfactant of the present disclosure can react with $CO_2$ after the introduction of $CO_2$, thereby forming the stable covalent bonds and significantly increasing the system viscosity, performing the function of plugging gas channeling channels. In addition, the $CO_2$ reactive viscosity-increasing polymer surfactant is not easily influenced by external factors, it has excellent chemical stability, a high plugging strength, and can achieve the long-term and effective blocking. Moreover, the $CO_2$ reactive viscosity-increasing polymer surfactant can significantly reduce the viscosity of heavy oil, which leads to the improved displacement efficiency of heavy oil.

DETAILED DESCRIPTION

Figure 1:
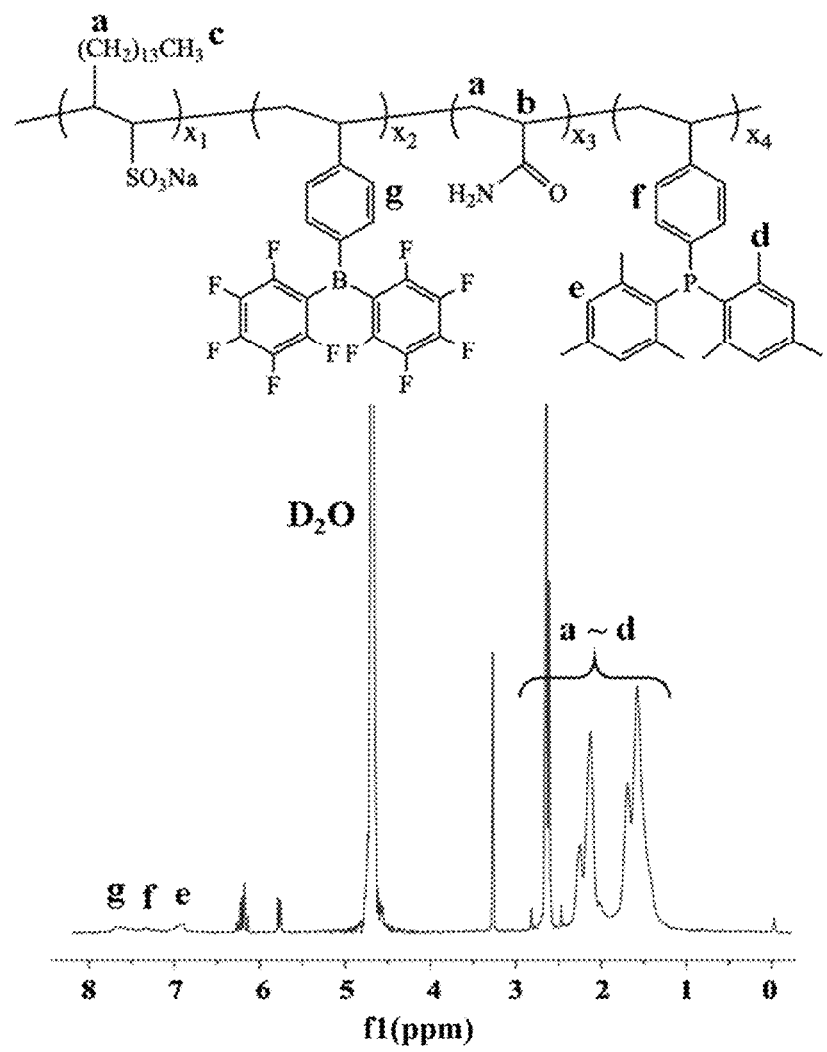
FIG. 1 illustrates the $^1$H NMR spectrogram of the $CO_2$ reactive viscosity-increasing polymer surfactant prepared in Example 1.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point values of the various ranges, and the individual point values may be combined with one another to produce one or more new numerical ranges, which should be deemed have been specifically disclosed herein.

As previously mentioned, the first aspect of the present disclosure provides a $CO_2$ reactive viscosity-increasing polymer surfactant, wherein the $CO_2$ reactive viscosity-increasing polymer surfactant comprises structural units provided by a Lewis acid monomer represented by formula (1), structural units provided by a Lewis base monomer represented by formula (2), structural units provided by a hydrophilic monomer, and structural units provided by an interfacially active monomer represented by formula (3);

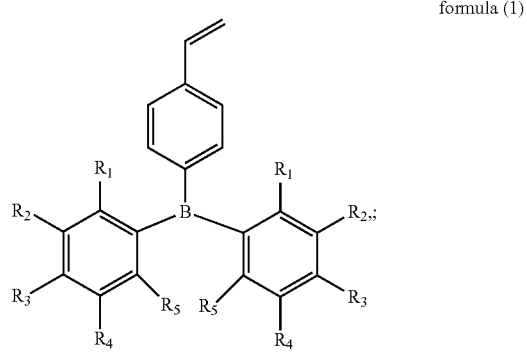
formula (1)

wherein $R_1$, $R_2$, $R_3$, $R_4$ and $R_5$ in formula (1) are the same or different, each is one or more of H, F, $C_1$-$C_4$ alkyl alcohol, and at least one group is F;

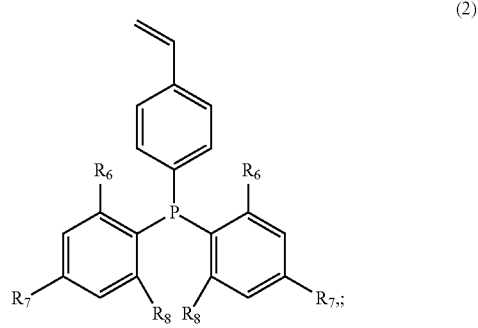
(2)

wherein $R_6$, $R_7$ and $R_8$ in formula (2) are the same or different, each is one or more of H, $C_1$-$C_4$ alkyl;

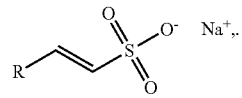

formula (3)

wherein R in formula (3) is one or more of $C_{10}$-$C_{16}$ alkyl.

According to the present disclosure, $R_1$, $R_2$, $R_3$, $R_4$ and $R_5$ in formula (1) are the same or different, each is one or more of H, F, $C_1$-$C_3$ alkyl alcohol, and at least one group is F.

According to the present disclosure, preferably, the Lewis acid monomer is selected from one or more Lewis acid monomers represented by formula (1-1), formula (1-2), formula (1-3), formula (1-4), and formula (1-5);

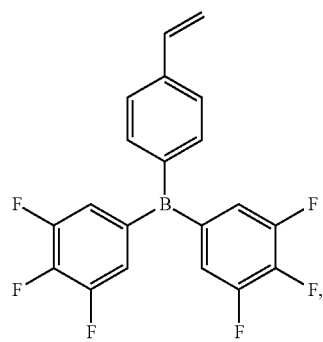

formula (1-1)

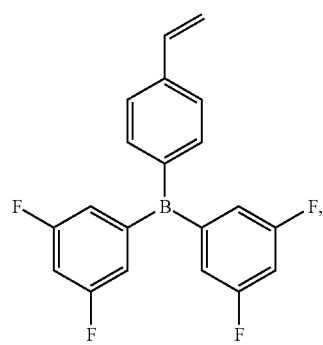

formula (1-2)

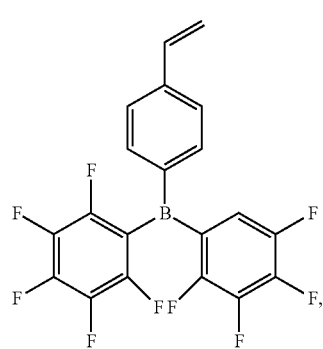

formula (1-3)

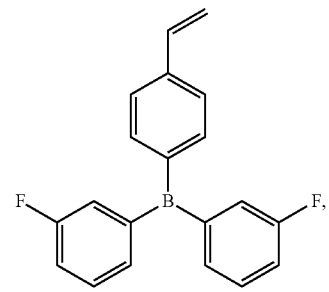

formula (1-4)

formula (1-5)

That is, in the present disclosure, the structure represented by formula (1-1) is bis(3,4,5-trifluorophenyl) (4-ethenylphenyl) borane; the structure represented by formula (1-2) is bis(3,5-difluorophenyl) (4-ethenylphenyl) borane; the structure represented by formula (1-3) is bis(pentafluorophenyl) (4-ethenylphenyl) borane; the structure represented by formula (1-4) is bis(3-fluorophenyl) (4-ethenylphenyl) borane; and the structure represented by formula (1-5) is bis[3,5-difluoro(4-hydroxymethyl)phenyl](4-ethenylphenyl) borane.

More preferably, the Lewis acid monomer is one or more selected from the group consisting of bis(pentafluorophenyl) (4-ethenylphenyl) borane, bis(3,5-difluorophenyl) (4-ethenylphenyl) borane, and bis(3,4,5-trifluorophenyl) (4-ethenylphenyl) borane.

According to the present disclosure, $R_6$, $R_7$ and $R_8$ in formula (2) are the same or different, each is one or more of H, $C_1$-$C_3$ alkyl.

According to the present disclosure, preferably, the Lewis base monomer is selected from one or more Lewis base monomers represented by formula (2-1), formula (2-2), formula (2-3), formula (2-4), and formula (2-5);

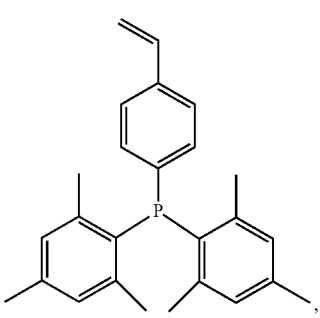

formula (2-1)

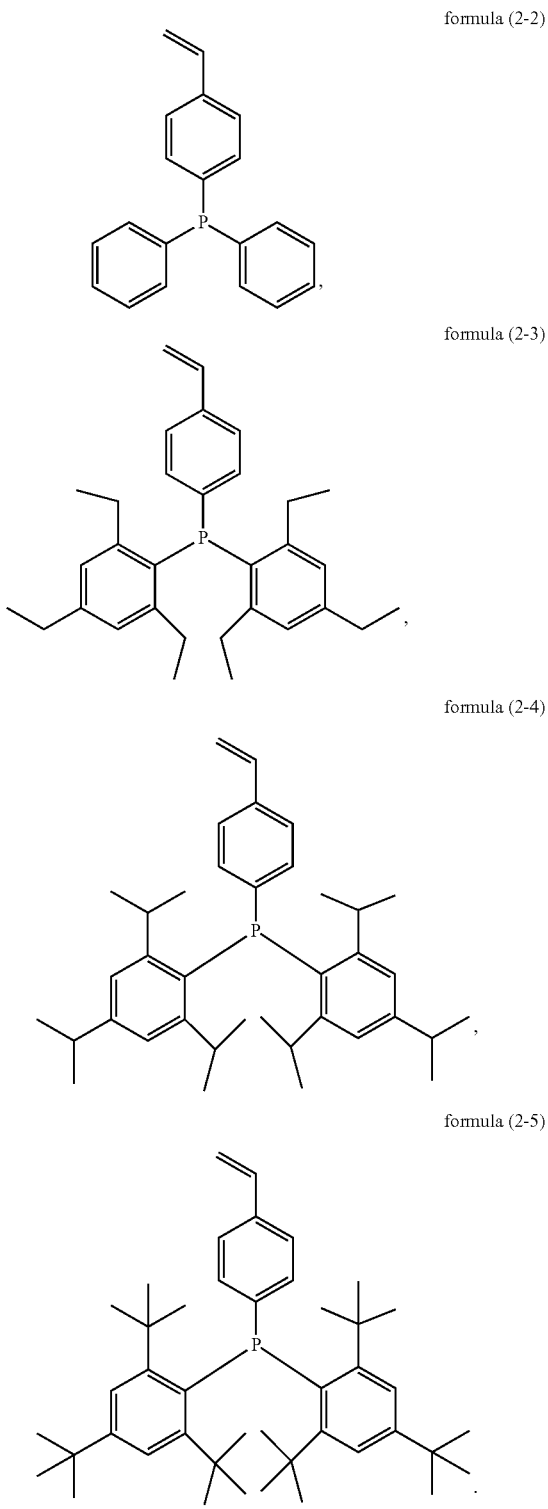

formula (2-2)

formula (2-3)

formula (2-4)

formula (2-5)

That is, in the present disclosure, the structure represented by formula (2-1) is bis(2,4,6-trimethylphenyl) (4-ethenylphenyl) phosphane; the structure represented by formula (2-2) is diphenyl (4-ethenylphenyl) phosphane; the structure represented by formula (2-3) is bis(2,4,6-triethylphenyl) (4-ethenylphenyl) phosphane; the structure represented by formula (2-4) is bis(2,4,6-triisopropylphenyl) (4-ethe-nylphenyl) phosphane; and the structure represented by formula (2-5) is bis(2,4,6-tri-tert-butylphenyl) (4-ethenylphenyl) phosphane.

According to the present disclosure, more preferably, the Lewis base monomer is one or more selected from the group consisting of bis(2,4,6-trimethylphenyl) (4-ethenylphenyl) phosphane, bis(2,4,6-triethylphenyl) (4-ethenylphenyl) phosphane, and bis(2,4,6-triisopropylphenyl) (4-ethenylphenyl) phosphane.

According to the present disclosure, the Lewis acid monomer has a purity within the range of 82-98%, preferably within the range of 82.06-97.88%, more preferably within the range of 90-98%.

According to the present disclosure, the Lewis base monomer has a purity within the range of 80-99%, preferably within the range of 80.3-98.82%, more preferably within the range of 92.38-98.82%.

According to the present disclosure, the hydrophilic monomer is one or more selected from the group consisting of acrylamide, N-vinylamide, acrylic acid and methacrylic acid.

According to the present disclosure, R in formula (3) is one or more of $C_{10}$-$C_{16}$ alkyl.

According to the present disclosure, the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.4-2.5):(10-100):(0.5-10), preferably 1:(0.5-2):(25-80):(0.7-6), more preferably 1:(0.7-1.5):(30-70):(1-4), further more preferably 1:(0.8-1.3):(40-60):(1.5-3).

According to the present disclosure, the $CO_2$ reactive viscosity-increasing polymer surfactant has a number average molecular weight within the range of 100,000-2,000,000, preferably within the range of 500,000-1,500,000, more preferably within the range of 800,000-1,200,000, further more preferably within the range of 900,000-1,100,000.

In the present disclosure, the method of preparing a Lewis acid monomer represented by formula (1) comprising:
(S1) Dropwise adding a solution containing a compound having a structure represented by formula (S-1) into a solution containing a boron halide compound and an anhydrous solvent under the protection of nitrogen gas to perform a first reaction;

formula (S-1)

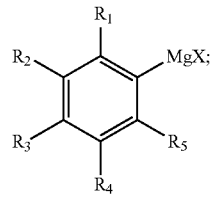

formula (S-2)

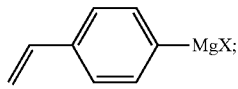

wherein each X in structures represented by formula (S-1) and formula (S-2) is halogen;
wherein $R_1$, $R_2$, $R_3$, $R_4$ and $R_5$ in formula (1) are the same or different, each is one or more of H, F, $C_1$-$C_4$ alkyl alcohol, and at least one group is F;

(S2) Dropwise adding the solution containing a compound having the structure represented by formula (S-2) into the reaction solution after the step (S1) to perform the second reaction to prepare a Lewis acid monomer.

The inventors of the present disclosure have discovered that each of the reaction processes shall be carried out under the anhydrous and anaerobic conditions. In the for preparing a Lewis acid monomer of the present disclosure, the raw materials (S-1) and (S-2) in use are Grignard reagent, which performs a violent reaction upon contacting with water, generates flammable hydrocarbons RH and Mg(OH)X (where R represents alkyl and X represents halogen), resulting in many impurities in the product or even reaction failure, thus the reaction shall be performed in an anhydrous condition; in addition, the presence of oxygen gas will lead to oxidation of boron, which results in many impurities in the product and yield loss, thus the reaction shall be performed under an anaerobic condition.

According to the present disclosure, the anhydrous solvent is anhydrous tetrahydrofuran and/or anhydrous ethyl ether; in the present disclosure, the solvent is subjected to an anhydrous treatment before use, to prevent the effect of moisture on the reaction progress during the reaction process.

In particular, the anhydrous tetrahydrofuran may be treated with the following method: adding a clipped sodium block into tetrahydrofuran, refluxing under the condition of isolating the moisture, removing water and peroxide therein, then distilling to collect the fraction to obtain the anhydrous tetrahydrofuran.

Similarly, the anhydrous ethyl ether may be treated with the following method: adding a clipped sodium block into tetrahydrofuran, refluxing under the condition of isolating the moisture, removing water and peroxide therein, then distilling to collect the fraction to obtain the anhydrous ethyl ether.

According to the present disclosure, the weight ratio of the anhydrous solvent to the total dosage of the compound having a structure represented by formula (S-1), the boron halide compound, and the compound having a structure represented by formula (S-2) is (100-500):100, preferably (150-400):100.

According to the present disclosure, X in the structures represented by formula (S-1) and formula (S-2) are each one or more selected from the group consisting of Cl, Br, F, and I.

According to the present disclosure, preferably, the compound having the structure represented by formula (S-I) is one or more selected from the group consisting of pentafluorophenyl magnesium bromide, pentafluorophenyl magnesium chloride, 3,5-difluorophenyl magnesium bromide, and 3,4,5-trifluorophenyl magnesium chloride.

According to the present disclosure, the compound having a structure represented by formula (S-2) is preferably p-styrene magnesium bromide and/or p-styrene magnesium chloride.

According to the present disclosure, the boron halide compound is preferably one or more selected from the group consisting of $BCl_3$, $BBr_3$, $BF_3$ and $BI_3$.

According to the present disclosure, the molar ratio of the used amount of the compound having a structure represented by formula (S-1), the boron halide compound, and the compound having a structure represented by formula (S-2) is 1:(0.1-1.5):(0.05-1.5), preferably 1:(0.2-1.5):(0.1-1.5), more preferably 1:(0.3-0.7):(0.2-0.6).

In the present disclosure, in the solution of step (S1), the concentration of the solution containing the compound having a structure represented by formula (S-1) is within the range of 1 mol/L-4 mol/L; moreover, in the present disclosure, the solvent in the solution containing the compound having a structure represented by formula (S-1) is not particularly limited, the solvent may be tetrahydrofuran or ethyl ether, preferably ethyl ether, i.e., an ethyl ether solution containing the compound having a structure represented by formula (S-1).

In the present disclosure, in the solution of step (S2), the solution containing the compound having a structure represented by formula (S-2) has a concentration within the range of 1 mol/L-3 mol/L; moreover, in the present disclosure, the solvent in the solution containing the compound having a structure represented by formula (S-2) is not particularly limited, the solvent may be tetrahydrofuran or ethyl ether, preferably ethyl ether, i.e., an ethyl ether solution containing the compound having a structure represented by formula (S-2).

According to the present disclosure, the first reaction conditions in step (S1) comprises a temperature from −10° C. to 15° C. and a time within the range of 1-6 h; preferably, a temperature from −5° C. to 5° C. and a time within the range of 2-4 h.

According to the present disclosure, the second reaction conditions in step (S2) comprise: initially performing the reaction under the temperature from −10° C. to 10° C. for 1-4 h, and then heating to 20-35° C. for performing the reaction for 8-16 h; more preferably, initially performing the reaction under the temperature of 0-5° C. for 1-2 h, and then heating to 20-35° C. for performing the reaction for 12-15 h.

In the present disclosure, the reaction in step (S1) is preferably carried out under the stirring conditions, the stirring rate is within the range of 200-800 rpm, more preferably, the stirring rate is within the range of 400-500 rpm.

In the present disclosure, the reaction in step (S2) is preferably carried out under the stirring conditions, the stirring rate is within the range of 300-800 rpm, more preferably, the stirring rate is within the range of 400-600 rpm.

In the present disclosure, more preferably in step (S1), the solution containing a compound having a structure represented by formula (S-1) is dropwise added into the solution containing a borane halide compound and an anhydrous solvent to carry out the first reaction; wherein the dropwise adding rate may be 0.5-2 drops/sec. In the present disclosure, an use of the dropwise adding mode has the advantages that the reaction rate can be effectively controlled, the excessively violent reaction process is avoided, the generation of side reaction products is reduced, the purity and yield of the products are improved.

In the present disclosure, more preferably in step (S2), the solution containing a compound having a structure represented by formula (S-2) is dropwise added into the reaction solution after step (S1) to carry out the second reaction; wherein the dropwise adding rate may be 0.5-2 drops/sec. In the present disclosure, an use of the dropwise adding mode has the advantages that the reaction rate can be effectively controlled, the excessively violent reaction process is avoided, the generation of side reaction products is reduced, the purity and yield of the products are improved.

According to the present disclosure, the method further comprising: subjecting the crude product mixed liquor after step (S2) to a separation purification process; preferably, the separation purification method comprising: removing a solvent under vacuum from the crude product mixed liquor after the reaction in step (S2), and then clipping the obtained residue to prepared a Lewis acid monomer.

According to the present disclosure, the method for removing a solvent under vacuum is reduced pressure distillation; preferably, the conditions of reduced pressure distillation comprise: a temperature within the range of 120-150° C., and a pressure from −0.1 MPa to 1×10⁻⁷ MPa.

According to the present disclosure, the obtained residue is shredded and then sublimed, the sublimation is preferably a reduced pressure sublimation; preferably, the conditions for reduced pressure sublimation comprise: a temperature within the range of 120-150° C., and a pressure from −0.1 MPa to $1\times10^{-7}$ MPa.

In the present disclosure, the preparation of a Lewis base monomer represented by formula (2) comprising:

(J1) Dropwise adding the solution containing a compound having a structure represented by formula (J-1) into the solution containing a phosphorus halide compound and an anhydrous solvent under the protection of nitrogen gas to carry out the first reaction;

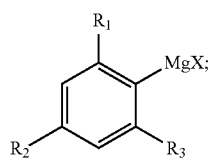

formula (J-1)

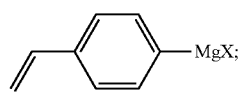

formula (J-2)

wherein each X in structures represented by formula (J-1) and formula (J-2) is halogen;
wherein $R_1$, $R_2$ and $R_3$ are the same or different, each is one or more of H, $C_1$-$C_4$ alkyl;

(J2) Dropwise adding the solution containing a compound having a structure represented by formula (J-2) into the reaction solution after the step (J1) to perform the second reaction, such that a Lewis base monomer is prepared.

The inventors of the present disclosure have discovered that each of the reaction processes shall be carried out under the anhydrous and anaerobic conditions. In the method of preparing a Lewis base monomer of the present disclosure, the raw materials (J-1) and (J-2) in use are Grignard reagent, which performs a violent reaction upon contacting with water, generates flammable hydrocarbons RH and Mg(OH)X (where R represents alkyl and X represents halogen), resulting in many impurities in the product or even reaction failure, thus the reaction shall be performed in an anhydrous condition; in addition, the presence of oxygen gas will lead to oxidation of boron, which results in many impurities in the product and yield loss, thus the reaction shall be performed under an anaerobic condition.

According to the present disclosure, the anhydrous solvent is anhydrous tetrahydrofuran and/or anhydrous ethyl ether; in the present disclosure, the solvent is subjected to an anhydrous treatment before use, to prevent the effect of moisture on the reaction progress during the reaction process.

In particular, the anhydrous tetrahydrofuran may be treated with the following method: adding a clipped sodium block into tetrahydrofuran, refluxing under the condition of isolating the moisture, removing water and peroxide therein, then distilling to collect the fraction to obtain the anhydrous tetrahydrofuran.

Similarly, the anhydrous ethyl ether may be treated with the following method: adding a clipped sodium block into tetrahydrofuran, refluxing under the condition of isolating the moisture, removing water and peroxide therein, then distilling to collect the fraction to obtain the anhydrous ethyl ether.

According to the present disclosure, the weight ratio of the anhydrous solvent to the total dosage of the compound having a structure represented by formula (J-1), the boron halide compound, and the compound having a structure represented by formula (J-2) is (100-500):100, preferably (150-400):100.

According to the present disclosure, X in the structures represented by formula (J-1) and formula (J-2) are each one or more selected from the group consisting of Cl, Br, F, and I.

According to the present disclosure, the compound having a structure represented by formula (J-1) is preferably one or more selected from the group consisting of 2,4,6-trimethylphenyl magnesium chloride, 2,4,6-trimethylphenyl magnesium bromide, 2,4,6-triethylphenyl magnesium chloride, 2,4,6-triisopropylphenyl magnesium bromide, and 2,4,6-tri-tert-butylphenyl magnesium bromide.

According to the present disclosure, the compound having a structure represented by formula (J-2) is preferably p-styrene magnesium bromide and/or p-styrene magnesium chloride.

According to the present disclosure, the phosphorous halide compound is preferably one or more selected from the group consisting of $PCl_3$, $PBr_3$, $PF_3$ and $PI_3$.

According to the present disclosure, the molar ratio of the used amount of the compound having a structure represented by formula (J-1), the phosphorus halide compound, and the compound having a structure represented by formula (J-2) is 1:(0.1-2):(0.05-2), preferably 1:(0.2-1):(0.1-0.8), more preferably 1:(0.2-0.6):(0.1-0.5), and further more preferably 1:(0.4-0.6):(0.3-0.5).

In the present disclosure, in the solution of step (J1), the solution containing the compound having a structure represented by formula (J-1) has a concentration within the range of 0.5 mol/L-4 mol/L; moreover, in the present disclosure, the solvent in the solution containing the compound having a structure represented by formula (J-1) is not particularly limited, the solvent is preferably tetrahydrofuran or ethyl ether, i.e., a tetrahydrofuran solution containing the compound having a structure represented by formula (J-1), an ethyl ether solution containing the compound having a structure represented by formula (J-1).

In the present disclosure, in the solution of step (J2), the solution containing the compound having a structure represented by formula (J-2) has a concentration within the range of 0.5 mol/L-2 mol/L; moreover, in the present disclosure, the solvent in the solution containing the compound having a structure represented by formula (J-2) is not particularly limited, the solvent is preferably tetrahydrofuran or ethyl ether, i.e., a tetrahydrofuran solution containing the compound having a structure represented by formula (J-2), an ethyl ether solution containing the compound having a structure represented by formula (J-2).

According to the present disclosure, in step (J1), the first reaction conditions comprises a temperature from 0° C. to 25° C. and a time within the range of 10-16 h; preferably, a temperature from 0° C. to 10° C. and a time within the range of 12-14 h.

According to the present disclosure, the second reaction conditions in step (J2) comprises a temperature from 0° C. to 35° C. and a time within the range of 10-18 h; preferably, a temperature from 0° C. to 15° C. and a time within the range of 13-16 h.

In the present disclosure, the first reaction in step (J1) is preferably carried out under the stirring conditions, the stirring rate is within the range of 200-700 rpm, more preferably, the stirring rate is within the range of 300-400 rpm.

In the present disclosure, the second reaction in step (J2) is preferably carried out under the stirring conditions, the stirring rate is within the range of 300-700 rpm, more preferably, the stirring rate is within the range of 400-500 rpm.

In the present disclosure, more preferably in step (J1), the solution containing a compound having a structure represented by formula (J-1) is dropwise added into the solution containing a boron halide compound and an anhydrous solvent to carry out the first reaction; wherein the dropwise adding rate may be 0.5-2 drops/sec. In the present disclosure, an use of the dropwise adding mode has the advantages that the reaction rate can be effectively controlled, the excessively violent reaction process is avoided, the generation of side reaction products is reduced, the purity and yield of the products are improved.

In the present disclosure, more preferably in step (J2), the solution containing a compound having a structure represented by formula (J-2) is dropwise added into the reaction solution after step (J1) to carry out the second reaction; wherein the dropwise adding rate may be 0.5-2 drops/sec.

In the present disclosure, an use of the dropwise adding mode has the advantages that the reaction rate can be effectively controlled, the excessively violent reaction process is avoided, the generation of side reaction products is reduced, the purity and yield of the products are improved.

According to the present disclosure, the method further comprising: subjecting the crude product mixed liquor after step (J2) to a separation purification process; preferably, the separation purification method comprises the following steps:
(i) Contacting the crude product mixed liquor after the reaction of step (J2) with a saturated salt solution, subsequently extracting with ethyl ether, and collecting an organic phase;
(ii) Subjecting the organic phase to drying, distillation concentration and precipitation treatment to obtain a crude product;
(iii) Subjecting the crude product to a chromatographic treatment to prepare a Lewis base monomer.

According to the present disclosure, the salt solution in step (i) may be one of NaCl, NH$_4$Cl, MgCl$_2$, CaCl$_2$), preferably NaCl or NH$_4$Cl.

According to the present disclosure, the weight ratio of the crude product mixed liquor, the saturated salt solution, and the ethyl ether in step (i) is 1:(0.5-2):(1-4), preferably 1:(0.5-2):(1.5-4), more preferably 1:(0.5-1.5):(1-3).

In the present disclosure, the distillation concentration in step (ii) is carried out by rotary distillation; preferably, the rotary distillation conditions comprise a temperature of 25-40° C. and a pressure from −0.08 MPa to −0.1 MPa.

According to the present disclosure, the viscous oily liquid obtained after the distillation concentration contacts with an alcohol solvent for performing a precipitation treatment; in the present disclosure, the alcohol solvent in step (ii) may be one of methanol, isopropanol, n-butanol, and isobutanol, preferably methanol.

According to the present disclosure, the weight ratio of the viscous oily liquid to the alcoholic solvent is preferably 1:(2-4).

In the present disclosure, the filling material of the chromatography column in step (iii) may be one of silica gel, alumina, and ion exchange resin, preferably alumina.

The second aspect of the present disclosure provides a method for preparing the aforementioned CO$_2$ reactive viscosity-increasing polymer surfactant, wherein the method comprising:
(F1) Blending the Lewis acid monomer represented by formula (1), the Lewis base monomer represented by formula (2), the hydrophilic monomer, and the interfacially active monomer represented by formula (3) with a solvent to obtain a mixture;
(F2) Contacting the mixture with an initiator under the protection of an inert gas to carry out the reaction;
(F3) Contacting the reaction product obtained from step (F2) with an alcohol solvent, and subjecting to precipitation, filtration and drying treatment to prepare a CO$_2$ reactive viscosity-increasing polymer surfactant;

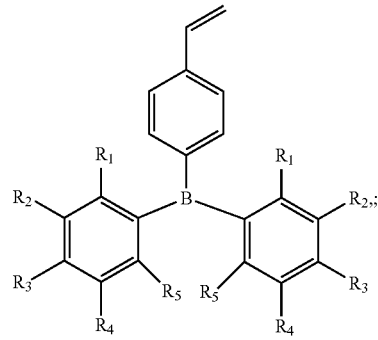

formula (1)

wherein $R_1$, $R_2$, $R_3$, $R_4$ and $R_5$ in formula (1) are the same or different, each is one or more of H, F, C$_1$-C$_4$ alkyl alcohol, and at least one group is F;

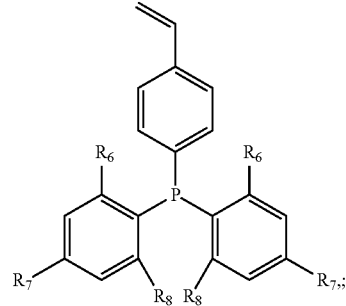

formula (2)

wherein $R_6$, $R_7$ and $R_8$ in formula (2) are the same or different, each is one or more of H, C$_1$-C$_4$ alkyl;

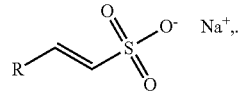

formula (3)

wherein R in formula (3) is one or more of $C_{10}$-$C_{16}$ alkyl.

According to the present disclosure, the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.5-2):(20-100):(1-10), preferably 1:(0.6-1.5):(30-80):(1-6), more preferably 1:(0.7-1.3):(40-70):(2-5), further more preferably 1:(0.8-1.2):(50-70):(2-3).

According to the present disclosure, the initiator is used in an amount of 0.1-0.8 wt %, preferably 0.2-0.5 wt %, based on the total weight of the used amounts of the Lewis acid monomer represented by formula (1), the Lewis base monomer represented by formula (2), the hydrophilic monomer, and the interfacially active monomer represented by formula (3).

According to the present disclosure, the solvent may be selected from solvents which do not inhibit or retard the polymerization reaction; preferably, the solvent is at least two selected from the group consisting of toluene, chloroform, dimethyl sulfoxide, N,N-dimethylformamide, and cyclohexane.

According to the present disclosure, the concentrations of the Lewis acid monomer represented by formula (1), the Lewis base monomer represented by formula (2), the hydrophilic monomer, and the interfacially active monomer represented by formula (3) in the solvent are the same or different, each is within the range of 10-30 wt %, for example, 10 wt %, 12 wt %, 15 wt %, 17.5 wt %, 20 wt %, 25 wt %, 30 wt %, and a random value within the range consisting of any two numerical values mentioned above.

According to the present disclosure, the initiator is one or more selected from the group consisting of an azo type initiator, an organic peroxide type initiator, an inorganic peroxide type initiator, and an oil-soluble redox type initiator, preferably an azo type initiator.

In particular, the initiator is one or more selected from the group consisting of azobisisobutyrimidazoline hydrochloride, azobisisobutyrylcyane carboxamide, azobisisobutyronitrile, azobiscarboxyethyl-2-isobutylamide hydrate, azobismethyl N-2-hydroxybutyl acrylamide, azobiscyclohexyl carbonitrile, azobisisovaleronitrile, and preferably azobisisobutyronitrile.

According to the present disclosure, the reaction conditions in step (F2) comprise a reaction temperature within the range of 40-100° C. and a reaction time within the range of 12-28 h; preferably, a reaction temperature within the range of 60-80° C. and a reaction time within the range of 16-24 h.

In the present disclosure, preferably, the radical polymerization reaction is carried out under the stirring conditions, the stirring rate is within the range of 100-500 rpm, more preferably, within the range of 200-400 rpm.

According to the present disclosure, the separate purification method in the preparation process of the $CO_2$ reactive viscosity-increasing polymer surfactant is not particularly limited, the $CO_2$ reactive viscosity-increasing polymer surfactant can be prepared by subjecting the reaction mass obtained from the radical polymerization reaction to the precipitating, filtering and drying process. For example, the reaction mass obtained from the radical polymerization reaction is precipitated in an alcohol solvent and filtered, and then dried under vacuum to a constant weight to obtain the $CO_2$ reactive viscosity-increasing polymer surfactant.

Wherein the alcoholic solvent is preferably one or more selected from the group consisting of methanol, ethanol, isopropanol, and n-butanol, more preferably methanol; preferably, the drying conditions comprise the vacuum drying at the temperature of 30-50° C., more preferably the vacuum drying at the temperature of 40° C.

The third aspect of the present disclosure provides a method of using the aforementioned $CO_2$ reactive viscosity-increasing polymer surfactant for controlling gas channeling in offshore $CO_2$ driven heavy oil operation.

In the present disclosure, the offshore heavy oil is derived from Bohai Sea Oilfield.

The present disclosure will be described below in detail with reference to examples.

In the following examples and comparative examples:

The $^1$H NMR spectrogram parameters were measured by the nuclear magnetic resonance hydrogen spectrometry; the molecular weight of the polymer was determined through the Gel Permeation Chromatography (GPC); the viscosity parameter was measured with an Anton paar MCR 72 type rheometer according to the test process specified in the China National Standard GB/T16321-2008; the plugging rate was measured through a physical simulation flow experimental method for rock cores. The reagents and raw materials in use were commercially available from Shanghai Aladdin Biochemical technology Co., Ltd.

Preparation Example 1

The preparation served to illustrate the Lewis acid prepared by the present disclosure.

(S1) An ethyl ether solution of pentafluorophenyl magnesium bromide having a concentration of 2 mol/L was dropwise added into boron trifluoride diethyl etherate with a dropwise adding rate of 0.5 drop/sec under the protection of nitrogen gas at 0° C., and the reaction was continued at a stirring rate of 400 rpm and 0° C. for 3 h;

(S2) An ethyl ether solution of p-styrene magnesium bromide was dropwise added into the mixed liquor of step (S1) at a dropwise adding rate of 0.5 drop/sec at 0° C. under the condition with a stirring rate of 500 rpm. After completion of the dropwise adding process, the reaction mixture was continuously stirred at 0° C. for 2 h, and then heated to room temperature and continuously stirred for 14 h, a crude product mixed liquor containing the target product was obtained; wherein the ethyl ether solution of p-styrene magnesium bromide had a concentration of 2 mol/L;

Wherein the molar ratio of pentafluorophenyl magnesium bromide, boron trifluoride, and p-styrene magnesium bromide was 1:0.4:0.4;

(S3) The crude product mixed liquor obtained from step (S2) was subjected to vacuum distillation (25° C., −0.08 MPa), the residue was sheared and then sublimated (130° C., 1×10$^{-7}$ MPa), the Lewis acid monomer bis(pentafluorophenyl) (4-ethenylphenyl) borane was obtained, its structure was shown below:

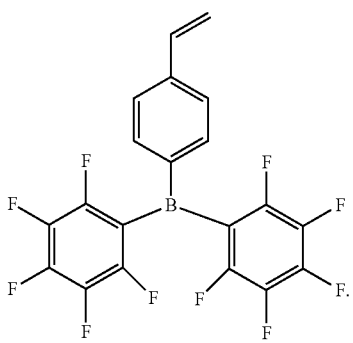 [SMILES: C=Cc1ccc(B(c2c(F)c(F)c(F)c(F)c2F)c2c(F)c(F)c(F)c(F)c2F)cc1]

The yield and purity of the prepared Lewis acid monomer was shown in Table 1.

Figure 2:
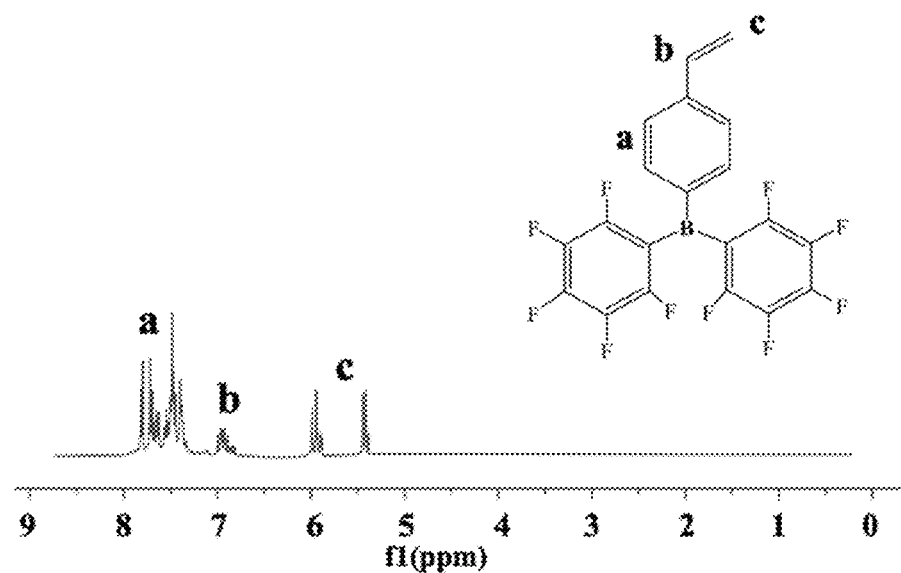
FIG. 2 illustrates the $^1$H NMR spectrogram of the Lewis acid monomer prepared in Preparation Example 1.

FIG. 2 illustrated the $^1$H NMR spectrogram of the Lewis acid monomer prepared in Preparation Example 1, as can be seen from the NMR spectrogram of FIG. 2: on the abscissa, the chemical shifts 7.49-7.81 (m, 4H) ppm indicated the peak of group a (H on the styrene group); the chemical shift 6.91 (d, 1H) ppm indicated the peak of group b (H on —CH=C—); the chemical shifts 5.42-5.97 (d, 2H) ppm represented the peak of group c (H on —C=CH$_2$).

Figure 3:
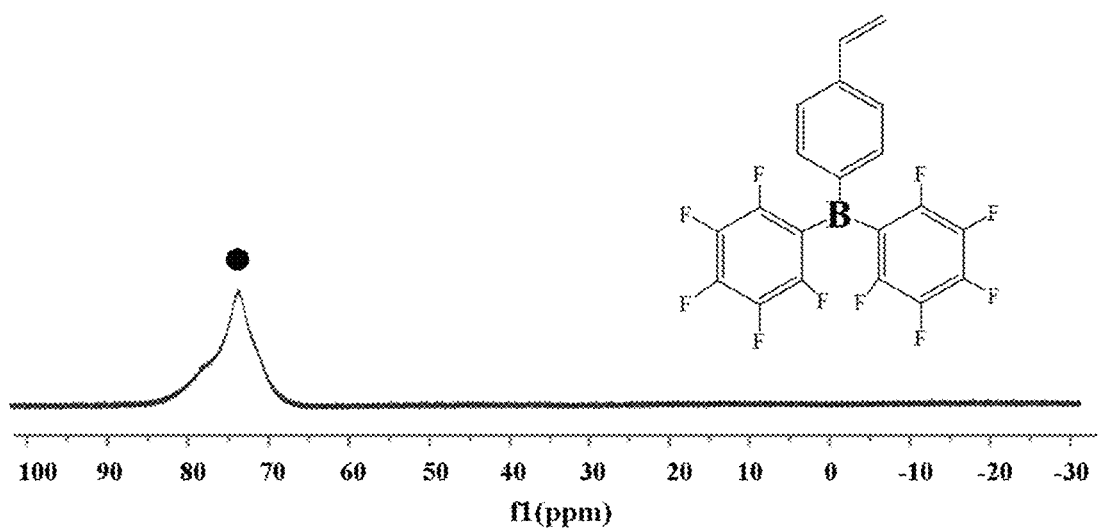
FIG. 3 illustrates the $^{11}$B NMR spectrogram of the Lewis acid monomer prepared in Preparation Example 1.

FIG. 3 illustrated the $^{11}$B NMR spectrogram of the Lewis acid monomer prepared in Preparation Example 1, as can be seen from FIG. 3, the chemical shift B: 74.3 (br) ppm indicated the peak of B (boron group).

Preparation Example 2

The preparation served to illustrate the Lewis acid prepared by the present disclosure.

The Lewis acid was prepared with the same method as that in Preparation Example 1, except that "pentafluorophenyl magnesium bromide" was replaced by "3, 5-difluorophenyl magnesium bromide".

The prepared Lewis acid monomer was bis(3,5-difluorophenyl) (4-ethenylphenyl) borane, its structure was shown below, the yield and purity of the prepared Lewis acid monomer was shown in Table 1.

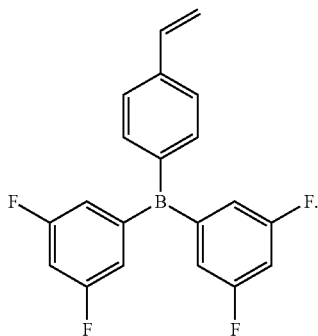 [SMILES: C=Cc1ccc(B(c2cc(F)cc(F)c2)c2cc(F)cc(F)c2)cc1]

Preparation Example 3

The preparation served to illustrate the Lewis acid prepared by the present disclosure.

The Lewis acid was prepared with the same method as that in Preparation Example 1, except that "pentafluorophenyl magnesium bromide" was replaced by "3,4, 5-trifluorophenyl magnesium bromide".

The prepared Lewis acid monomer was bis(3,4,5-trifluorophenyl) (4-ethenylphenyl) borane, its structure was shown below, the yield and purity of the prepared Lewis acid monomer was shown in Table 1.

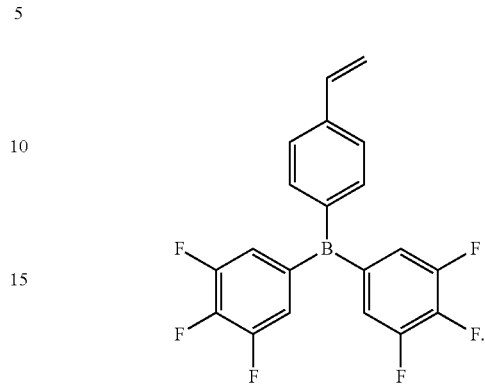

Preparation Example 4

The preparation served to illustrate the Lewis acid prepared by the present disclosure.

The Lewis acid was prepared with the same method as that in Preparation Example 1, except that "pentafluorophenyl magnesium bromide" was replaced by "3-fluorophenyl magnesium bromide".

The prepared Lewis acid monomer was bis(3-fluorophenyl) (4-ethenylphenyl) borane, its structure was shown below, the yield and purity of the prepared Lewis acid monomer was shown in Table 1.

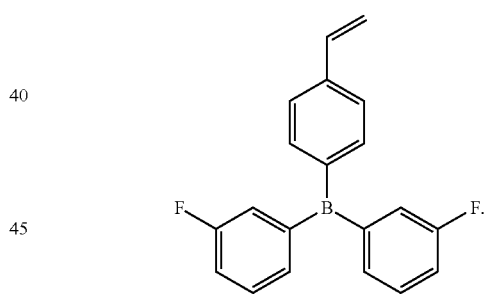

Preparation Example 5

The preparation served to illustrate the Lewis acid prepared by the present disclosure.

The Lewis acid was prepared with the same method as that in Preparation Example 1, except that "pentafluorophenyl magnesium bromide" was replaced by "4-methano-3,5-difluorophenyl magnesium bromide".

The prepared Lewis acid monomer was bis[3,5-difluoro (4-hydroxymethyl)phenyl](4-ethenylphenyl) borane, its structure was shown below, the yield and purity of the prepared Lewis acid monomer was shown in Table 1.

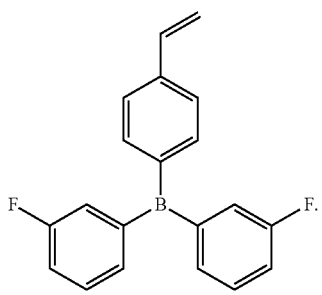 [SMILES: C=Cc1ccc(B(c2cccc(F)c2)c2cccc(F)c2)cc1]

TABLE 1

| Items | Yield (%) | Purity (%) |
|---|---|---|
| Preparation Example 1 | 57.83 | 97.88 |
| Preparation Example 2 | 29.53 | 84.22 |
| Preparation Example 3 | 29.84 | 83.12 |
| Preparation Example 4 | 31.77 | 84.75 |
| Preparation Example 5 | 23.12 | 82.06 |

Preparation Example 6

The preparation served to illustrate a Lewis base prepared by the present disclosure.

(J1) Under the protection of nitrogen gas, the phosphorus trichloride was dissolved in anhydrous tetrahydrofuran, 2,4,6-trimethylphenyl magnesium bromide tetrahydrofuran solution was then slowly and dropwise added at a dropwise adding rate of 1 drop/sec, the reaction was performed with a stirring rate of 400 rpm at 0° C. for 12 h; wherein the 2,4,6-trimethylphenyl magnesium bromide tetrahydrofuran solution had a concentration of 1 mol/L.

(J2) A p-styrene magnesium bromide tetrahydrofuran solution was dropwise added into the mixed liquor of step (J1) at a dropwise adding rate of 1 drop/sec at 0° C. under the condition with a stirring rate of 500 rpm. After completion of the dropwise adding process, the reaction mixture was continuously stirred at 0° C. for 15 h, a crude product mixed liquor containing the target product was obtained; wherein the p-styrene magnesium bromide tetrahydrofuran solution had a concentration of 1 mol/L;

Wherein the molar ratio of 2,4,6-trimethylphenyl magnesium bromide, phosphane trichloride, and p-styrene magnesium bromide was 1:0.5:0.5.

(J3) A saturated NaCl solution was added into the crude product mixed liquor obtained in step (J2), and then extracted with diethyl ether, the organic phase was collected and dried with anhydrous magnesium sulfate, and subjected to rotary evaporation (30° C., −0.08 MPa), the obtained concentrated solution was added into methanol, a crude product was obtained.

Wherein the weight ratio of the crude product mixed liquor, the saturated NaCl solution, and the ethyl ether was 1:0.5:1.5; the weight ratio of the concentrated solution and methanol was 1:3.

(J4) The crude product obtained from step (J3) was passed through a neutral alumina chromatography column, a Lewis base monomer bis(2,4,6-trimethylphenyl) (4-ethenylphenyl) phosphane was obtained, its structure was shown below:

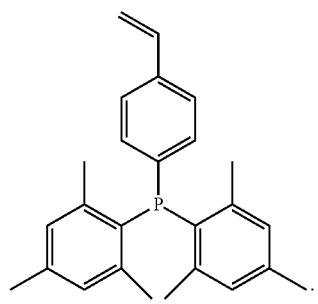

The yield and purity of the prepared Lewis base monomer was shown in Table 2.

Figure 4:
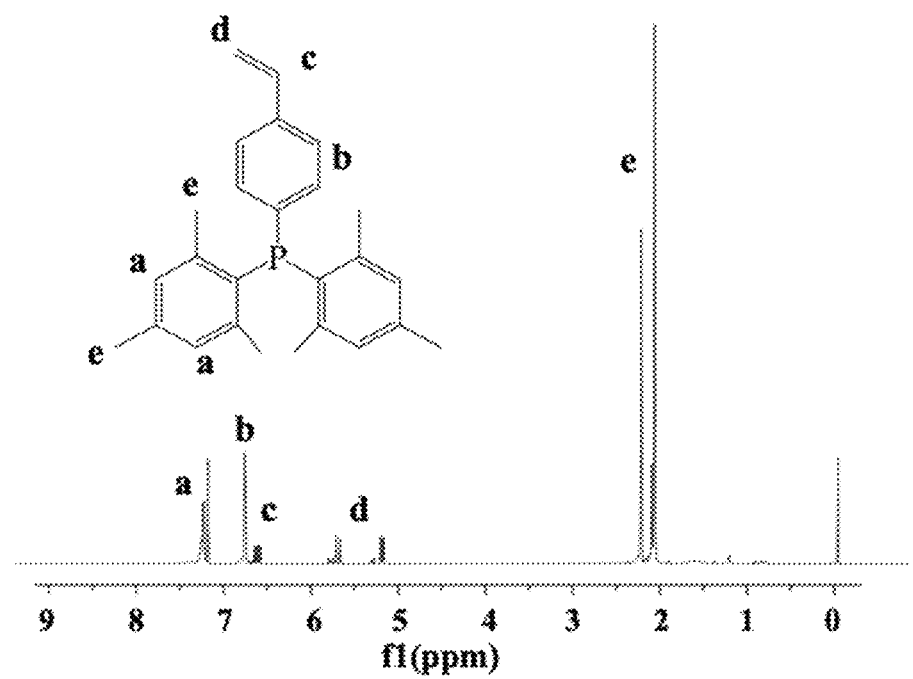
FIG. 4 illustrates the $^1$H NMR spectrogram of the Lewis base monomer prepared in Preparation Example 6.

FIG. 4 illustrated the $^1$H NMR spectrogram of the Lewis base monomer prepared in Preparation Example 6, as can be seen from the NMR spectrogram of FIG. 4: on the abscissa, the chemical shifts 7.17-7.35 (m, 4H) ppm indicated the peak of group a (H on the benzene ring of the mesitylene group); the chemical shift 6.85 (m, 4H) ppm represented the peak of group b (H on the benzene ring of the styrene group); the chemical shift 6.64 (d, 1H) ppm indicated the peak of group c (H on —CH═C—); the chemical shifts 5.28-5.75 (d, 2H) ppm represented the peak of group d (H on —C═CH$_2$); the chemical shifts 2.10-2.24 (s, 18H) ppm indicated the peak of group e (H on —CH$_3$).

Figure 5:
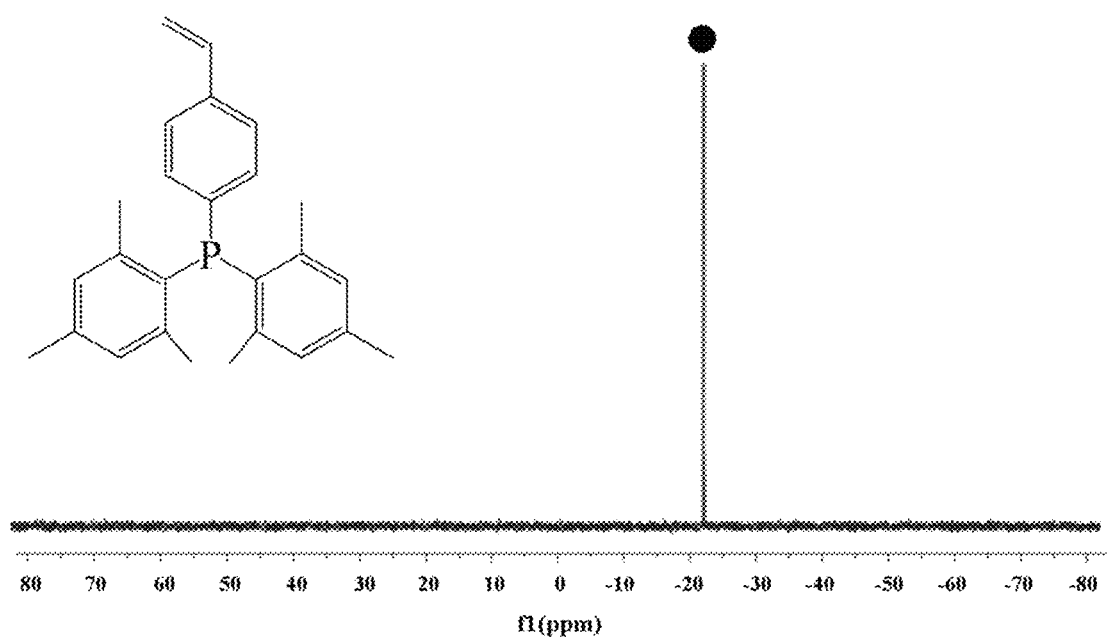
FIG. 5 illustrates the $^{31}$P NMR spectrogram of the Lewis base monomer prepared in Preparation Example 6.

FIG. 5 illustrated the $^{31}$P NMR spectrogram of the Lewis base monomer prepared in Preparation Example 6, as can be seen from FIG. 5, the chemical shift P: −22.1(s) ppm represented the peak of P (phosphorus group).

Preparation Example 7

The preparation served to illustrate the Lewis base prepared by the present disclosure.

The Lewis base was prepared with the same method as that in Preparation Example 6, except that "2,4,6-trimethylphenyl magnesium bromide" was replaced by "2,4,6-triethylphenyl magnesium chloride".

The prepared Lewis base monomer was bis(2,4,6-triethylphenyl) (4-ethenylphenyl) phosphane, its structure was shown below, the yield and purity of the prepared Lewis base monomer was shown in Table 2.

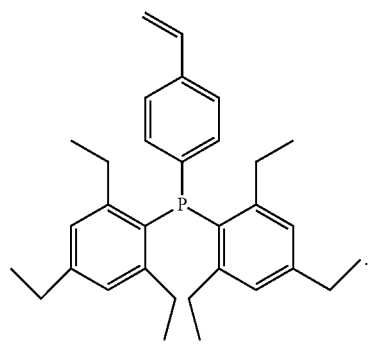 [SMILES: C=Cc1ccc(P(c2c(CC)cc(CC)cc2CC)c2c(CC)cc(CC)cc2CC)cc1]

Preparation Example 8

The preparation served to illustrate the Lewis base prepared by the present disclosure.

The Lewis base was prepared with the same method as that in Preparation Example 6, except that "2,4,6-trimethylphenyl magnesium bromide" was replaced by "2,4,6-triisopropylphenyl magnesium chloride".

The prepared Lewis base monomer was bis(2,4,6-triisopropylphenyl) (4-ethenylphenyl) phosphane, its structure was shown below, the yield and purity of the prepared Lewis base monomer was shown in Table 2.

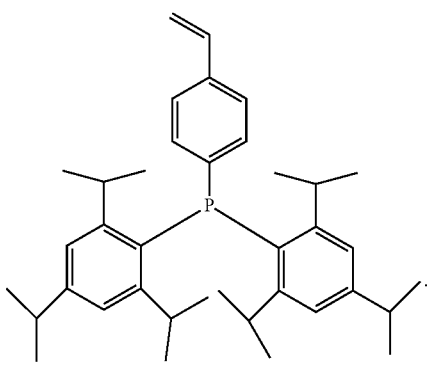 [SMILES: C=Cc1ccc(P(c2c(C(C)C)cc(C(C)C)cc2C(C)C)c2c(C(C)C)cc(C(C)C)cc2C(C)C)cc1]

Preparation Example 9

The preparation served to illustrate the Lewis base prepared by the present disclosure.

The Lewis base was prepared with the same method as that in Preparation Example 6, except that "2,4,6-trimethylphenyl magnesium bromide" was replaced by "phenyl magnesium chloride".

The prepared Lewis base monomer was diphenyl (4-ethenylphenyl) phosphane, its structure was shown below, the yield and purity of the prepared Lewis base monomer was shown in Table 2.

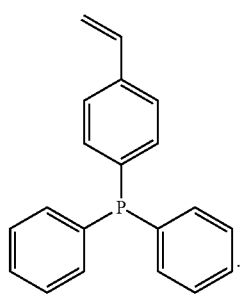 [SMILES: C=Cc1ccc(P(c2ccccc2)c2ccccc2)cc1]

Preparation Example 10

The preparation served to illustrate the Lewis base prepared by the present disclosure.

The Lewis base was prepared with the same method as that in Preparation Example 6, except that "2,4,6-trimethylphenyl magnesium bromide" was replaced by "2,4,6-tri-tert-butylphenyl magnesium chloride".

The prepared Lewis base monomer was bis(2,4,6-tri-tert-butylphenyl) (4-ethenylphenyl) phosphane, its structure was shown below, the yield and purity of the prepared Lewis base monomer was shown in Table 2.

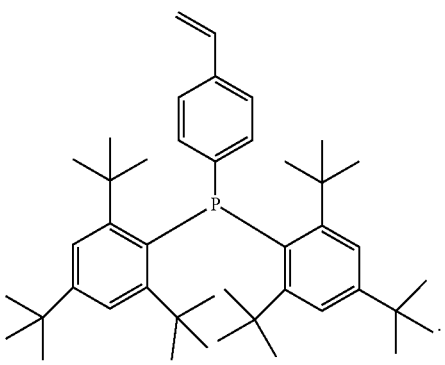 [SMILES: C=Cc1ccc(P(c2c(C(C)(C)C)cc(C(C)(C)C)cc2C(C)(C)C)c2c(C(C)(C)C)cc(C(C)(C)C)cc2C(C)(C)C)cc1]

TABLE 2

| Items | Yield (%) | Purity (%) |
|---|---|---|
| Preparation Example 6 | 61.24 | 98.82 |
| Preparation Example 7 | 33.49 | 86.33 |
| Preparation Example 8 | 32.12 | 84.57 |
| Preparation Example 9 | 29.83 | 81.45 |
| Preparation Example 10 | 25.64 | 80.3 |

Example 1

The example served to illustrate a $CO_2$ reactive viscosity-increasing polymer surfactant prepared with the method of the present disclosure.

(1) In a reactor equipped with a temperature control device and a reflux condensing unit, the bis(pentafluorophenyl) (4-ethenylphenyl) borane prepared in Preparation Example 1, the bis(2,4,6-trimethylphenyl) (4-ethenylphenyl) phosphane prepared in Preparation Example 6, acrylamide, and sodium $C_{14}$-alkenyl sulfonate were sequentially added into a mixed solvent of toluene and dimethyl sulfoxide, the materials were mixed and stirred.

Wherein the molar ratio of bis(pentafluorophenyl) (4-ethenylphenyl) borane, bis(2,4,6-trimethylphenyl) (4-ethenylphenyl) phosphane, acrylamide to sodium $C_{14}$-alkenyl sulfonate was 1:1:60:2, the concentration of the monomer mixture in the mixing solvent was 15 wt %, and the volume ratio of toluene and dimethyl sulfoxide was 2:3.

(2) Nitrogen gas was introduced for 30 min, an initiator azobisisobutyronitrile was then added into the mixed liquor, the temperature was increased to 62° C., the reaction was performed at a stirring rate of 300 rpm for 24 h.

Wherein the azobisisobutyronitrile was used in an amount of 0.5 wt % based on the total weight of the monomer mixture.

(3) Methanol was added into the reaction mass, the solid was precipitated, and a filtering was performed, the solid was subjected to vacuum drying to a constant weight at 40° C., a $CO_2$ reactive viscosity-increasing polymer surfactant was prepared, the parameter characterization was as shown in Table 3.

Wherein the volume ratio of methanol to the mixed solvent of toluene and dimethyl sulfoxide was 2:1.

FIG. 1 illustrated the $^1H$ NMR spectrogram of the $CO_2$ reactive viscosity-increasing polymer surfactant prepared in Example 1, as can be seen from the NMR spectrogram in FIG. 1, the peaks of groups a-d (—$CH_3$, —$CH_2$—, H on —CH—) were presented at the chemical shifts 1.22-2.75 ppm in the horizontal coordinate; the peak of group e (H in the benzene ring of the mesitylene group) was indicated at the chemical shift 6.99 ppm; the peak of group f (H in the benzene ring attached to P) was presented at the chemical shifts 7.17-7.38 ppm; the peak of group g (H in the benzene ring attached to B) was presented at the chemical shifts 7.56-7.78 ppm.

Example 2

The example served to illustrate a $CO_2$ reactive viscosity-increasing polymer surfactant prepared with the method of the present disclosure.

(1) In a reactor equipped with a temperature control device and a reflux condensing unit, the bis(pentafluorophenyl) (4-ethenylphenyl) borane prepared in Preparation Example 1, the bis(2,4,6-trimethylphenyl) (4-ethenylphenyl) phosphane prepared in Preparation Example 6, acrylamide, and sodium $C_{16}$-alkenyl sulfonate were sequentially added into a mixed solvent of chloroform and dimethyl sulfoxide, the materials were mixed and stirred.

Wherein the molar ratio of bis(pentafluorophenyl) (4-ethenylphenyl) borane, bis(2,4,6-trimethylphenyl) (4-ethenylphenyl) phosphane, acrylamide to sodium $C_{16}$-alkenyl sulfonate was 1:0.8:50:3, the concentration of the monomer mixture in the mixing solvent was 20 wt %, and the volume ratio of chloroform and dimethyl sulfoxide was 1:3.

(2) Nitrogen gas was introduced for 30 min, an initiator azobisisobutyronitrile was then added into the mixed liquor, the temperature was increased to 60° C., the reaction was performed at a stirring rate of 400 rpm for 20 h.

Wherein the azobisisobutyronitrile was used in an amount of 0.3 wt % based on the total weight of the monomer mixture.

(3) Methanol was added into the reaction mass, the solid was precipitated, and a filtering was performed, the solid was subjected to vacuum drying to a constant weight at 30° C., a $CO_2$ reactive viscosity-increasing polymer surfactant was prepared, the parameter characterization was as shown in Table 3.

Wherein the volume ratio of methanol to the mixed solvent of chloroform and dimethyl sulfoxide was 1:1.

Example 3

The example served to illustrate a $CO_2$ reactive viscosity-increasing polymer surfactant prepared with the method of the present disclosure.

(1) In a reactor equipped with a temperature control device and a reflux condensing unit, the bis(pentafluorophenyl) (4-ethenylphenyl) borane prepared in Preparation Example 1, the bis(2,4,6-trimethylphenyl) (4-ethenylphenyl) phosphane prepared in Preparation Example 6, acrylamide, and sodium $C_{16}$-alkenyl sulfonate were sequentially added into a mixed solvent of toluene and N,N-dimethylformamide, the materials were mixed and stirred.

Wherein the molar ratio of bis(pentafluorophenyl) (4-ethenylphenyl) borane, bis(2,4,6-trimethylphenyl) (4-ethenylphenyl) phosphane, acrylamide to sodium $C_{16}$-alkenyl sulfonate was 1:1.2:70:2, the concentration of the monomer mixture in the mixing solvent was 25 wt %, and the volume ratio of toluene and N,N-dimethylformamide was 1:2.

(2) Nitrogen gas was introduced for 60 min, an initiator azobisisobutyronitrile was then added into the mixed liquor, the temperature was increased to 70° C., the reaction was performed at a stirring rate of 200 rpm for 16 h.

Wherein the azobisisobutyronitrile was used in an amount of 0.3 wt % based on the total weight of the monomer mixture.

(3) Ethanol was added into the reaction mass, the solid was precipitated, and a filtering was performed, the solid was subjected to vacuum drying to a constant weight at 40° C., a $CO_2$ reactive viscosity-increasing polymer surfactant was prepared, the parameter characterization was as shown in Table 3.

Wherein the volume ratio of ethanol to the mixed solvent of toluene and N, N-dimethylformamide was 3:1.

Example 4

The example served to illustrate a $CO_2$ reactive viscosity-increasing polymer surfactant prepared with the method of the present disclosure.

(1) In a reactor equipped with a temperature control device and a reflux condensing unit, the bis(pentafluorophenyl) (4-ethenylphenyl) borane prepared in Preparation Example 1, the bis(2,4,6-trimethylphenyl) (4-ethenylphenyl) phosphane prepared in Preparation Example 6, methacrylic acid, and sodium $C_{14}$-alkenyl sulfonate were sequentially added into a mixed solvent of cyclohexane and dimethyl sulfoxide, the materials were mixed and stirred.

Wherein the molar ratio of bis(pentafluorophenyl) (4-ethenylphenyl) borane, bis(2,4,6-trimethylphenyl) (4-ethenylphenyl) phosphane, acrylamide to sodium $C_{14}$-alkenyl sulfonate was 1:0.6:40:1, the concentration of the monomer mixture in the mixing solvent was 10 wt %, and the volume ratio of cyclohexane and dimethyl sulfoxide was 1:1.

(2) Argon gas was introduced for 30 min, an initiator azoisobutyrylcyanometamide was then added into the mixed liquor, the temperature was increased to 80° C., the reaction was performed at a stirring rate of 500 rpm for 28 h.

Wherein the azoisobutyrylcyanometamide was used in an amount of 0.2 wt % based on the total weight of the monomer mixture.

(3) Ethanol was added into the reaction mass, the solid was precipitated, and a filtering was performed, the solid was subjected to vacuum drying to a constant weight at 50° C., a $CO_2$ reactive viscosity-increasing polymer surfactant was prepared, the parameter characterization was as shown in Table 3.

Wherein the volume ratio of ethanol to the mixed solvent of cyclohexane and dimethyl sulfoxide was 3:1.

Example 5

The example served to illustrate a $CO_2$ reactive viscosity-increasing polymer surfactant prepared with the method of the present disclosure.

(1) In a reactor equipped with a temperature control device and a reflux condensing unit, the bis(pentafluorophenyl) (4-ethenylphenyl) borane prepared in Preparation Example 1, the bis(2,4,6-trimethylphenyl) (4-ethenylphenyl) phosphane prepared in Preparation Example 6, N-vinylamide, and sodium $C_{16}$-alkenyl sulfonate were sequentially added into a mixed solvent of toluene and dimethyl sulfoxide, the materials were mixed and stirred.

Wherein the molar ratio of bis(pentafluorophenyl) (4-ethenylphenyl) borane, bis(2,4,6-trimethylphenyl) (4-ethenylphenyl) phosphane, acrylamide to sodium $C_{16}$-alkenyl sulfonate was 1:1.8:80:4, the concentration of the monomer mixture in the mixing solvent was 30 wt %, and the volume ratio of toluene and dimethyl sulfoxide was 1:2.

(2) Nitrogen gas was introduced for 45 min, an initiator azodimethyl N-2-hydroxybutylacrylamide was then added into the mixed liquor, the temperature was increased to 50° C., the reaction was performed at a stirring rate of 400 rpm for 12 h.

Wherein the azodimethyl N-2-hydroxybutylacrylamide was used in an amount of 0.6 wt % based on the total weight of the monomer mixture.

(3) Isopropanol was added into the reaction mass, the solid was precipitated, and a filtering was performed, the solid was subjected to vacuum drying to a constant weight at 50° C., a $CO_2$ reactive viscosity-increasing polymer surfactant was prepared, the parameter characterization was as shown in Table 3.

Wherein the volume ratio of isopropanol to the mixed solvent of toluene and dimethyl sulfoxide was 1:2.

Example 6

The example served to illustrate a $CO_2$ reactive viscosity-increasing polymer surfactant prepared with the method of the present disclosure.

The $CO_2$ reactive viscosity-increasing polymer surfactant was prepared with the same method as that in Example 1, except that "bis(pentafluorophenyl) (4-ethenylphenyl) borane" was replaced by "bis(3,5-difluorophenyl) (4-ethenylphenyl) borane prepared in Preparation Example 2", and "bis(2,4,6-trimethylphenyl) (4-ethenylphenyl) phosphane" was replaced by "bis(2,4,6-triethylphenyl) (4-ethenylphenyl) phosphorous prepared in Preparation Example 7".

A $CO_2$ reactive viscosity-increasing polymer surfactant was prepared, the parameter characterization was as shown in Table 3.

Example 7

The example served to illustrate a $CO_2$ reactive viscosity-increasing polymer surfactant prepared with the method of the present disclosure.

The $CO_2$ reactive viscosity-increasing polymer surfactant was prepared with the same method as that in Example 1, except that "bis(pentafluorophenyl) (4-ethenylphenyl) borane" was replaced by "bis(3,4,5-trifluorophenyl) (4-ethenylphenyl) borane prepared in Preparation Example 3", and "bis(2,4,6-trimethylphenyl) (4-ethenylphenyl) phosphane" was replaced by "bis(2,4,6-triisopropylphenyl) (4-ethenylphenyl) phosphane prepared in Preparation Example 8".

A $CO_2$ reactive viscosity-increasing polymer surfactant was prepared, the parameter characterization was as shown in Table 3.

Example 8

The example served to illustrate a $CO_2$ reactive viscosity-increasing polymer surfactant prepared with the method of the present disclosure.

The $CO_2$ reactive viscosity-increasing polymer surfactant was prepared with the same method as that in Example 1, except that "bis(pentafluorophenyl) (4-ethenylphenyl) borane" was replaced by "bis(3-fluorophenyl) (4-ethenylphenyl) borane prepared in Preparation Example 4", and "bis(2,4,6-trimethylphenyl) (4-ethenylphenyl) phosphane" was replaced by "diphenyl (4-ethenylphenyl) phosphorous prepared in Preparation Example 9".

A $CO_2$ reactive viscosity-increasing polymer surfactant was prepared, the parameter characterization was as shown in Table 3.

Example 9

The example served to illustrate a $CO_2$ reactive viscosity-increasing polymer surfactant prepared with the method of the present disclosure.

The $CO_2$ reactive viscosity-increasing polymer surfactant was prepared with the same method as that in Example 1, except that "bis(pentafluorophenyl) (4-ethenylphenyl) borane" was replaced by "bis[3,5-difluoro(4-hydroxymethyl)phenyl](4-ethenylphenyl) borane prepared in Preparation Example 5", and "bis(2,4,6-trimethylphenyl) (4-ethenylphenyl) phosphane" was replaced by "bis(2,4,6-tri-tert-butylphenyl) (4-ethenylphenyl) phosphane prepared in Preparation Example 10".

A $CO_2$ reactive viscosity-increasing polymer surfactant was prepared, the parameter characterization was as shown in Table 3.

Example 10

The example served to illustrate a $CO_2$ reactive viscosity-increasing polymer surfactant prepared with the method of the present disclosure.

The $CO_2$ reactive viscosity-increasing polymer surfactant was prepared with the same method as that in Example 1, except that "the mixed solvent of toluene and dimethyl sulfoxide" was replaced with "a single solvent dimethyl sulfoxide".

A $CO_2$ reactive viscosity-increasing polymer surfactant was prepared, the parameter characterization was as shown in Table 3.

Comparative Example 1

The $CO_2$ reactive viscosity-increasing polymer surfactant was prepared with the same method as that in Example 1, except that the Lewis acid monomer bis(pentafluorophenyl) (4-ethenylphenyl) borane was not added.

A $CO_2$ reactive viscosity-increasing polymer surfactant was prepared, the parameter characterization was as shown in Table 3.

Comparative Example 2

The $CO_2$ reactive viscosity-increasing polymer surfactant was prepared with the same method as that in Example 1, except that the Lewis base monomer bis(2,4,6-trimethylphenyl) (4-ethenylphenyl) phosphane was not added.

A $CO_2$ reactive viscosity-increasing polymer surfactant was prepared, the parameter characterization was as shown in Table 3.

Comparative Example 3

The $CO_2$ reactive viscosity-increasing polymer surfactant was prepared with the same method as that in Example 1, except that the interfacially active monomer sodium $C_{14}$ alkenyl sulfonate was not added.

A $CO_2$ reactive viscosity-increasing polymer surfactant was prepared, the parameter characterization was as shown in Table 3.

Comparative Example 4

The $CO_2$ reactive viscosity-increasing polymer surfactant was prepared with the same method as that in Example 1, except that the reaction temperature was set to 0° C.

A $CO_2$ reactive viscosity-increasing polymer surfactant was prepared, the parameter characterization was as shown in Table 3.

Comparative Example 5

The $CO_2$ reactive viscosity-increasing polymer surfactant was prepared with the same method as that in Example 1, except that an inert gas was not introduced.

A $CO_2$ reactive viscosity-increasing polymer surfactant was prepared, the parameter characterization was as shown in Table 3.

Comparative Example 6

The $CO_2$ reactive viscosity-increasing polymer surfactant was prepared with the same method as that in Example 1, except that the molar ratio of bis(pentafluorophenyl) (4-ethenylphenyl) borane, bis(2,4,6-trimethylphenyl) (4-ethenylphenyl) phosphane, acrylamide to sodium $C_{14}$ alkenyl sulfonate was changed from "1:1:60:2" to "1:20:60:2".

A $CO_2$ reactive viscosity-increasing polymer surfactant was prepared, the parameter characterization was as shown in Table 3.

Comparative Example 7

The $CO_2$ reactive viscosity-increasing polymer surfactant was prepared with the same method as that in Example 1, except that the molar ratio of bis(pentafluorophenyl) (4-ethenylphenyl) borane, bis(2,4,6-trimethylphenyl) (4-ethenylphenyl) phosphane, acrylamide to sodium $C_{14}$ alkenyl sulfonate was changed from "1:1:60:2" to "1:1:2:2".

A $CO_2$ reactive viscosity-increasing polymer surfactant was prepared, the parameter characterization was as shown in Table 3.

TABLE 3

| Items | The molar ratio of structural units provided by the Lewis acid monomer represented by formula (1), structural units provided by the Lewis base monomer represented by formula (2), structural units provided by a hydrophilic monomer, and structural units provided by the interfacially active monomer represented by formula (3) | Number average molecular weight (10,000) |
|---|---|---|
| Example 1 | 1:1.1:52:1.8 | 109 |
| Example 2 | 1:0.8:45:2.7 | 98 |
| Example 3 | 1:1.3:58:1.9 | 93 |
| Example 4 | 1:0.7:36:1.4 | 118 |
| Example 5 | 1:1.6:62:3.5 | 85 |
| Example 6 | 1:1:53:1.9 | 108 |
| Example 7 | 1:1.2:55:2.1 | 107 |
| Example 8 | 1:1:49:1.7 | 121 |
| Example 9 | 1:1.1:59:2.2 | 74 |
| Example 10 | 1:0.9:68:2.4 | 72 |
| Comparative Example 1 | 0:1:54:2.1 | 106 |
| Comparative Example 2 | 1:0:53:2 | 104 |
| Comparative Example 3 | 1:1:56:0 | 101 |
| Comparative Example 4 | 1:1.2:38:1.5 | 5 |
| Comparative Example 5 | 1:0.8:67:2.5 | 52 |
| Comparative Example 6 | 1:17:58:1.9 | 24 |
| Comparative Example 7 | 1:1.2:3.2:2 | 19 |

Test Examples

1. $CO_2$ Reactive Viscosity-Increasing Performance Test 0.5 g of the $CO_2$ reactive viscosity-increasing polymer surfactants prepared in Examples 1-10 and Comparative Examples 1-7 were added into 50 mL of water, respectively, and stirred at a high speed of 10,000 r/min for 30 min, the different polymer solutions were obtained, the initial viscosity of each polymer solution was measured by using an Anton paar MCR 72 type rheometer at a shearing rate of 10 $s^{-1}$ and the temperature of 25° C., $CO_2$ was then introduced into each polymer solution at a rate of 100 mL/min for 20 min, after the introduction process of $CO_2$ was accomplished, the polymer solution was subjected to standing still for 2 h, the final viscosity of each polymer solution was subsequently measured at a shearing rate of 10 $s^{-1}$ and the temperature of 25° C. The test results of viscosity of the different polymer solutions before and after the introduction of $CO_2$ were illustrated in Table 4.

TABLE 4

| Items | Initial viscosity (mPa · s) | The viscosity after introducing $CO_2$ (mPa · s) |
|---|---|---|
| Example 1 | 33.4 | 4784 |
| Example 2 | 33.2 | 4435 |
| Example 3 | 32.0 | 4520 |
| Example 4 | 34.4 | 4107 |
| Example 5 | 29.3 | 4018 |
| Example 6 | 33.8 | 3634 |
| Example 7 | 33.2 | 3482 |
| Example 8 | 34.7 | 3175 |
| Example 9 | 30.1 | 3076 |
| Example 10 | 30.5 | 3278 |
| Comparative Example 1 | 33.2 | 45.9 |
| Comparative Example 2 | 32.1 | 41.5 |
| Comparative Example 3 | 33.5 | 4492 |
| Comparative Example 4 | 7.6 | 97.3 |
| Comparative Example 5 | 24.3 | 1486 |
| Comparative Example 6 | 19.6 | 1084 |
| Comparative Example 7 | 17.8 | 947 |

As can be seen from Table 4, the $CO_2$ reactive viscosity-increasing polymer surfactants prepared in Examples 1-10 exhibit the significant viscosifying effect following an introduction of $CO_2$, but the Comparative Examples 1 and 2 lack the Lewis acid monomer or Lewis base monomer, the prepared $CO_2$ reactive viscosity-increasing polymer surfactants are substantially incapable of increasing viscosity following an introduction of $CO_2$, it indicates that the polymer surfactant only reacts with $CO_2$ in the presence of a Lewis acid monomer and a Lewis base monomer, resulting in crosslinking between the polymer chains, thereby increasing viscosity of the solution.

2. Plugging Performance Test

The $CO_2$ flooding was performed under the condition with an injection pressure of 3.5 MPa, the gas flooding was stopped after the gas channeling was stabilized, the $CO_2$ reactive viscosity-increasing polymer surfactant was then injected into cracks of the simulated rock core at an injection volume of 0.5 pore volume (PV), $CO_2$ was continuously injected after stabilization of the $CO_2$ reactive viscosity-increasing polymer surfactant system, the gas flow rates were measured at the cracks of the rock core before and after the plugging process. The $CO_2$ reactive viscosity-increasing polymer surfactant system was placed at 50° C. for 3 months, the gas flow rate at cracks of rock core was then measured, the plugging rate was calculated, the test results of plugging the gas channeling with $CO_2$ reactive viscosity-increasing polymer surfactant were shown in Table 5.

Wherein the calculation formula of the plugging rate was as follows: plugging rate (%)=(flow rate before plugging–flow rate after plugging)/flow rate before plugging×100%.

TABLE 5

| Items | Flow rate before plugging (mL/min) | Flow rate after plugging (mL/min) | Plugging rate (%) | Plugging rate after standing still at 50° C. for 3 months (%) |
|---|---|---|---|---|
| Example 1 | 650 | 40 | 93.8 | 93.6 |
| Example 2 | 650 | 48 | 92.6 | 92.3 |
| Example 3 | 650 | 45 | 93.1 | 92.7 |
| Example 4 | 650 | 55 | 91.5 | 91.9 |
| Example 5 | 650 | 57 | 91.2 | 90.8 |
| Example 6 | 650 | 80 | 87.7 | 86.4 |
| Example 7 | 650 | 93 | 85.7 | 84.6 |
| Example 8 | 650 | 105 | 83.8 | 82.2 |
| Example 9 | 650 | 110 | 83.1 | 81.4 |
| Example 10 | 650 | 102 | 84.3 | 81.8 |
| Comparative Example 1 | 650 | 486 | 25.2 | 24.1 |
| Comparative Example 2 | 650 | 490 | 24.6 | 23.3 |
| Comparative Example 3 | 650 | 47 | 92.8 | 91.6 |
| Comparative Example 4 | 650 | 404 | 37.8 | 34.2 |
| Comparative Example 5 | 650 | 276 | 57.5 | 51.4 |
| Comparative Example 6 | 650 | 318 | 51.2 | 45.8 |
| Comparative Example 7 | 650 | 332 | 48.9 | 44.7 |

As illustrated by Table 5, the $CO_2$ reactive viscosity-increasing polymer surfactants prepared with the method of the present disclosure have a plugging rate for the $CO_2$ gas channeling being 9100 or more under the preferred conditions, after the $CO_2$ reactive viscosity-increasing polymer surfactants are placed at 50° C. for 3 months, the plugging rate is substantially unchanged, it indicates that the $CO_2$ reactive viscosity-increasing polymer surfactants prepared with the method of the present disclosure have desirable plugging performance for the gas channel and chemical stability. In contrast, Comparative Examples 1-7 do not utilize the method of the present disclosure, the plugging rates of prepared polymer surfactants are significantly inferior to those of the Examples.

3. Heavy Oil Viscosity Reduction Performance Test 0.5 g of the $CO_2$ reactive viscosity-increasing polymer surfactants prepared in Examples 1-10 and Comparative Examples 1-7 were added into 50 mL of water, respectively, and stirred at a high speed of 10,000 r/min for 30 min, the different polymer solutions were obtained, which were added into the glass reagent bottles with the heavy oil according to the water/oil ratio of 1:1 in sequence, the glass reagent bottles were sealed and placed in a constant temperature oven at 50° C. and subjected to aging for 3 h, the reagent bottles were turned upside down four times, such that the oil phase and the water phase were blended to form a homogeneous emulsion, the viscosities of said heavy oil and said emulsion were measured by using an Anton paar MCR 72 type rheometer at a shearing rate of 10s' and the temperature of 25° C., the viscosity reduction rate was calculated, the heavy oil viscosity reduction test results of the $CO_2$ reactive viscosity-increasing polymer surfactants were shown in Table 6.

Where the viscosity reduction calculation formula was as follows: viscosity reduction rate (%)=(heavy oil viscosity–emulsion viscosity)/heavy oil viscosity×100%.

TABLE 6

| Items | Viscosity reduction rate (%) |
|---|---|
| Example 1 | 92.6 |
| Example 2 | 91.4 |
| Example 3 | 91.2 |
| Example 4 | 90.3 |
| Example 5 | 90.6 |
| Example 6 | 91.9 |
| Example 7 | 92.3 |
| Example 8 | 92.4 |
| Example 9 | 86.7 |
| Example 10 | 85.0 |
| Comparative Example 1 | 91.6 |
| Comparative Example 2 | 92.1 |
| Comparative Example 3 | 3.5 |
| Comparative Example 4 | 15.2 |
| Comparative Example 5 | 51.7 |
| Comparative Example 6 | 42.4 |
| Comparative Example 7 | 57.8 |

As can be seen from Table 6, the $CO_2$ reactive viscosity-increasing polymer surfactants prepared with the method of the present disclosure have a viscosity reduction rate greater than 90% for heavy oil under the preferred conditions, it indicates that the $CO_2$ reactive viscosity-increasing polymer surfactants exhibit desirable heavy oil viscosity reduction capability. In contrast, the Comparative Example 3 does not add an interfacially active monomer, it causes that the prepared product is essentially short of the emulsification viscosity reduction capability.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A $CO_2$ reactive viscosity-increasing polymer surfactant, wherein the $CO_2$ reactive viscosity-increasing polymer surfactant comprises structural units provided by a Lewis acid monomer represented by formula (1), structural units provided by a Lewis base monomer represented by formula (2), structural units provided by a hydrophilic monomer, and structural units provided by an interfacially active monomer represented by formula (3);

formula (1)

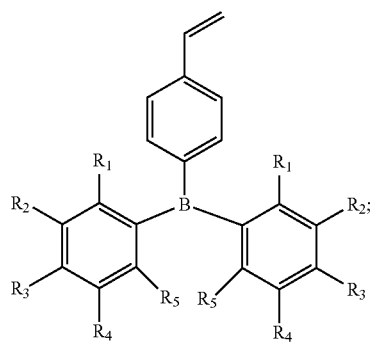

wherein $R_1$, $R_2$, $R_3$, $R_4$ and $R_5$ in formula (1) are the same or different, each is one or more of H, F, $C_1$-$C_4$ alkyl alcohol, and at least one group is F;

formula (2)

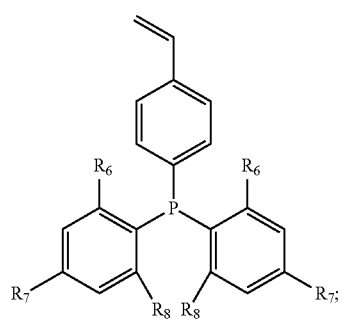

wherein $R_6$, $R_7$ and $R_8$ in formula (2) are the same or different, each is one or more of H, $C_1$-$C_4$ alkyl;

formula (3)

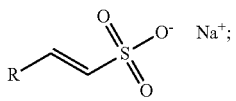

wherein R in formula (3) is one or more of $C_{10}$-$C_{16}$ alkyl.

2. The $CO_2$ reactive viscosity-increasing polymer surfactant of claim 1, wherein $R_1$, $R_2$, $R_3$, $R_4$ and $R_5$ in formula (1) are the same or different, each is one or more of H, F, $C_1$-$C_3$ alkyl alcohol, and at least one group is F.

3. The $CO_2$ reactive viscosity-increasing polymer surfactant of claim 2, wherein the Lewis acid monomer is selected from one or more Lewis acid monomers represented by formula (1-1), formula (1-2), formula (1-3), formula (1-4), and formula (1-5);

formula (1-1)

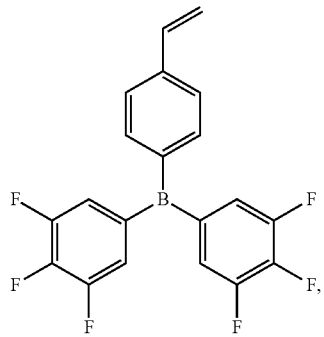

formula (1-2)

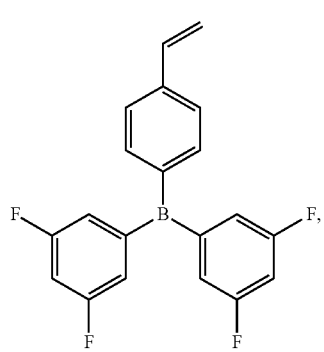

formula (1-3)

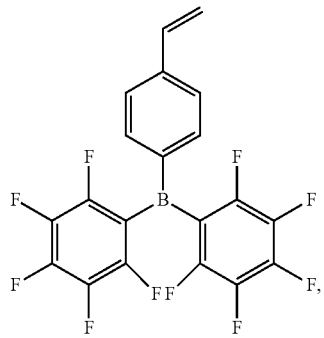

formula (1-4)

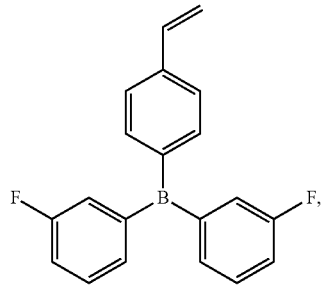

-continued formula (1-5)

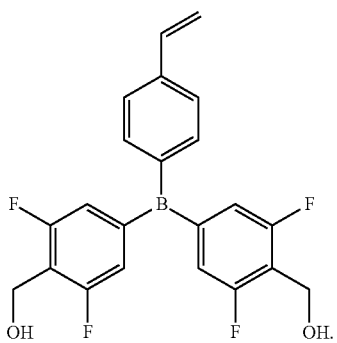

4. The CO₂ reactive viscosity-increasing polymer surfactant of claim 3, wherein the Lewis acid monomer is one or more selected from the group consisting of bis(pentafluorophenyl) (4-ethenylphenyl) borane, bis(3,5-difluorophenyl) (4-ethenylphenyl) borane, and bis(3,4,5-trifluorophenyl) (4-ethenylphenyl) borane.

5. The CO₂ reactive viscosity-increasing polymer surfactant of claim 1, wherein $R_6$, $R_7$ and $R_8$ in formula (2) are the same or different, each is one or more of H, $C_1$-$C_3$ alkyl.

6. The CO₂ reactive viscosity-increasing polymer surfactant of claim 5, wherein the Lewis base monomer is selected from one or more Lewis base monomers represented by formula (2-1), formula (2-2), formula (2-3), formula (2-4), and formula (2-5);

formula (2-1)

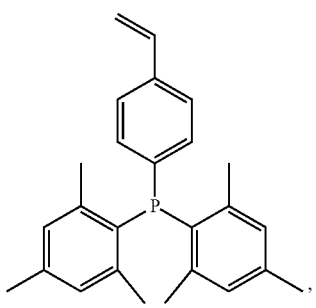

formula (2-2)

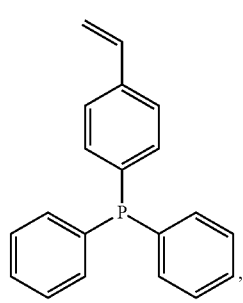

formula (2-3)

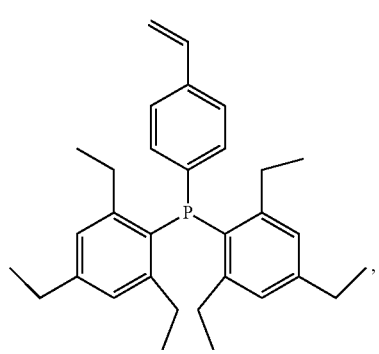

formula (2-4)

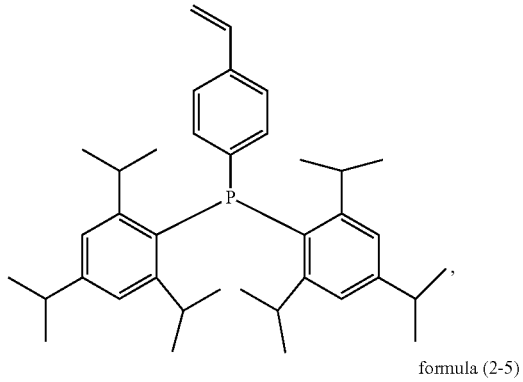

formula (2-5)

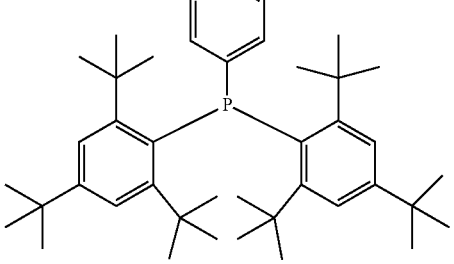

7. The CO₂ reactive viscosity-increasing polymer surfactant of claim 6, wherein the Lewis base monomer is one or more selected from the group consisting of bis(2,4,6-trimethylphenyl) (4-ethenylphenyl) phosphane, bis(2,4,6-triethylphenyl) (4-ethenylphenyl) phosphane, and bis(2,4,6-triisopropylphenyl) (4-ethenylphenyl) phosphane.

8. The CO₂ reactive viscosity-increasing polymer surfactant of claim 1, wherein the Lewis acid monomer has a purity within the range of 82-98%; the Lewis base monomer has a purity within the range of 80-99%.

9. The CO₂ reactive viscosity-increasing polymer surfactant of claim 8, wherein the Lewis acid monomer has a purity within the range of 82.06-97.88%; the Lewis base monomer has a purity within the range of 80.3-98.82%.

10. The CO₂ reactive viscosity-increasing polymer surfactant of claim 9, wherein the Lewis acid monomer has a purity within the range of 90-98%;
the Lewis base monomer has a purity within the range of 92.38-98.82%.

11. The CO₂ reactive viscosity-increasing polymer surfactant of claim 1, wherein the hydrophilic monomer is one or more selected from the group consisting of acrylamide, N-vinylamide, acrylic acid and methacrylic acid;

R in formula (3) is one or more of $C_{10}$-$C_{16}$ alkyl.

12. The $CO_2$ reactive viscosity-increasing polymer surfactant of claim 1, wherein the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.4-2.5):(10-100):(0.5-10); the $CO_2$ reactive viscosity-increasing polymer surfactant has a number average molecular weight within the range of 100,000-2,000,000 g/mol, measured by Gel Permeation Chromatography (GPC).

13. The $CO_2$ reactive viscosity-increasing polymer surfactant of claim 12, wherein the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.5-2):(25-80):(0.7-6); the $CO_2$ reactive viscosity-increasing polymer surfactant has a number average molecular weight within the range of 500,000-1,500,000 g/mol, measured by Gel Permeation Chromatography (GPC).

14. The $CO_2$ reactive viscosity-increasing polymer surfactant of claim 13, wherein the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.7-1.5):(30-70):(1-4); the $CO_2$ reactive viscosity-increasing polymer surfactant has a number average molecular weight within the range of 800,000-1,200,000 g/mol, measured by Gel Permeation Chromatography (GPC).

15. The $CO_2$ reactive viscosity-increasing polymer surfactant of claim 14, wherein the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.8-1.3):(40-60):(1.5-3); the $CO_2$ reactive viscosity-increasing polymer surfactant has a number average molecular weight within the range of 900,000-1,100,000 g/mol, measured by Gel Permeation Chromatography (GPC).

16. A method for preparing the $CO_2$ reactive viscosity-increasing polymer surfactant of claim 1, wherein the method comprising:
(F1) blending a Lewis acid monomer represented by formula (1), a Lewis base monomer represented by formula (2), a hydrophilic monomer, and an interfacially active monomer represented by formula (3) with a solvent to obtain a mixture;
(F2) contacting the mixture with an initiator under the protection of an inert gas to carry out reaction;
(F3) contacting the reaction product obtained from step (F2) with an alcohol solvent, and subjecting to precipitation, filtration and drying treatment to prepare a $CO_2$ reactive viscosity-increasing polymer surfactant;

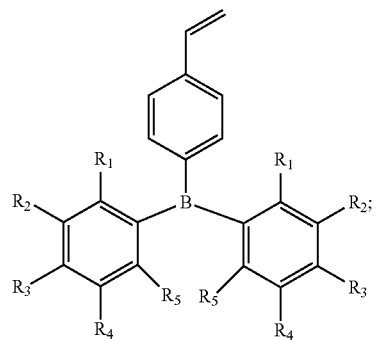

formula (1)

wherein $R_1$, $R_2$, $R_3$, $R_4$ and $R_5$ in formula (1) are the same or different, each is one or more of H, F, $C_1$-$C_4$ alkyl alcohol, and at least one group is F;

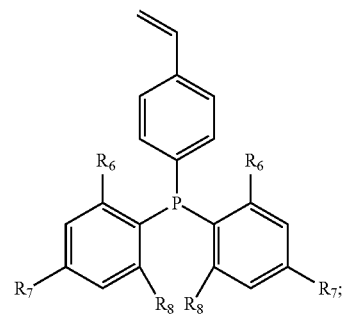

formula (2)

wherein $R_6$, $R_7$ and $R_8$ in formula (2) are the same or different, each is one or more of H, $C_1$-$C_4$ alkyl;

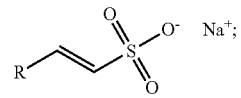

formula (3)

wherein R in formula (3) is one or more of $C_{10}$-$C_{16}$ alkyl.

17. The method of claim 16, wherein the molar ratio of structural units provided by the Lewis acid monomer represented by formula (1), structural units provided by the Lewis base monomer represented by formula (2), structural units provided by the hydrophilic monomer, and structural units provided by the interfacially active monomer represented by formula (3) is 1:(0.5-2):(20-100):(1-10).

18. The method of claim 17, wherein the initiator is used in an amount of 0.1-0.8 wt %, based on the total weight of the used amounts of the Lewis acid monomer represented by formula (1), the Lewis base monomer represented by formula (2), the hydrophilic monomer, and the interfacially active monomer represented by formula (3);
the solvent is at least two selected from the group consisting of toluene, chloroform, dimethyl sulfoxide, N,N-dimethylformamide, and cyclohexane;
the concentrations of the Lewis acid monomer represented by formula (1), the Lewis base monomer represented by formula (2), the hydrophilic monomer, and the interfacially active monomer represented by formula (3) in the solvent are the same or different, each is within the range of 10-30 wt %.

19. The method of claim 16, wherein the reaction conditions in step (F2) comprise a reaction temperature within the range of 40-100° C. and a reaction time within the range of 12-28 h.

\* \* \* \* \*